(12) United States Patent
Nomi

(10) Patent No.: US 12,429,963 B2
(45) Date of Patent: Sep. 30, 2025

(54) INFORMATION INPUT/OUTPUT SYSTEM FOR ACTIVE PEN WITH STORAGE

(71) Applicant: Wacom Co., Ltd., Saitama (JP)

(72) Inventor: Tsukasa Nomi, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/812,928

(22) Filed: Aug. 22, 2024

(65) Prior Publication Data

US 2024/0411388 A1    Dec. 12, 2024

Related U.S. Application Data

(63) Continuation of application No. 18/465,850, filed on Sep. 12, 2023, now Pat. No. 12,099,666, which is a
(Continued)

(30) Foreign Application Priority Data

Feb. 28, 2020   (JP) ................ 2020-033022

(51) Int. Cl.
*G06F 3/0354* (2013.01)
*G06F 3/038* (2013.01)
(Continued)

(52) U.S. Cl.
CPC ........ *G06F 3/03545* (2013.01); *G06F 3/0383* (2013.01); *G06F 3/0416* (2013.01);
(Continued)

(58) Field of Classification Search
None
See application file for complete search history.

(56) References Cited

U.S. PATENT DOCUMENTS 7,599,562 B2   10/2009   Liu
9,029,717 B2   5/2015    Lu
(Continued)

FOREIGN PATENT DOCUMENTS

CN    109643171 A    4/2019
JP    H09179678 A    7/1997
(Continued)

OTHER PUBLICATIONS

International Search Report, mailed May 11, 2021, for International Application No. PCT/JP2021/005137. (6 pages) (with English translation).

*Primary Examiner* — Stephen T. Reed
(74) *Attorney, Agent, or Firm* — Seed Intellectual Property Law Group LLP

(57) ABSTRACT

Disclosed herein is an information input/output system including an indication operation device, and an information processing device including a sensor. The indication operation device includes a first electrode, a second electrode, a signal generation circuit which generates a signal to be transmitted to the information processing device, a first transmission circuit which transmits the signal from the signal generation circuit to the sensor of the information processing device through the first electrode or the second electrode, a reception circuit which receives information from the information processing device through the first electrode or the second electrode, an information storage device which stores the information received by the reception circuit, and a transmitter which transmits the information stored in the information storage device to an outside of the indication operation device. The information processing device includes a processor, an acquisition circuit, and a second transmission circuit.

17 Claims, 12 Drawing Sheets

Related U.S. Application Data continuation of application No. 17/841,486, filed on Jun. 15, 2022, now Pat. No. 11,789,549, which is a continuation of application No. PCT/JP2021/005137, filed on Feb. 12, 2021.

(51) Int. Cl.
*G06F 3/041* (2006.01)
*G06F 3/044* (2006.01)

(52) U.S. Cl.
CPC ........ *G06F 3/04162* (2019.05); *G06F 3/0441* (2019.05); *G06F 3/0442* (2019.05); *G06F 3/0446* (2019.05)

(56) References Cited

U.S. PATENT DOCUMENTS

| | | | |
|---|---|---|---|
| 9,503,561 | B2 | 11/2016 | Liu et al. |
| 10,606,406 | B2 | 3/2020 | Park |
| 2006/0192772 | A1* | 8/2006 | Kambayashi ....... G06F 3/03545 345/179 |
| 2014/0059169 | A1* | 2/2014 | Ko ..................... G06F 3/04845 709/217 |
| 2016/0077655 | A1 | 3/2016 | Oda |
| 2016/0320918 | A1 | 11/2016 | Hara |
| 2017/0228049 | A1* | 8/2017 | Yamamoto ............ G06F 3/0383 |
| 2019/0324560 | A1 | 10/2019 | Wilson-Haynes |
| 2020/0033965 | A1* | 1/2020 | Bakken ................ G06F 3/0442 |

FOREIGN PATENT DOCUMENTS

| | | |
|---|---|---|
| JP | 2003323455 A | 11/2003 |
| JP | 2018206093 A | 12/2018 |
| WO | WO 2016171114 A1 | 10/2016 |
| WO | WO 2018043203 A1 | 3/2018 |
| WO | 2020008638 A1 | 1/2020 |

* cited by examiner

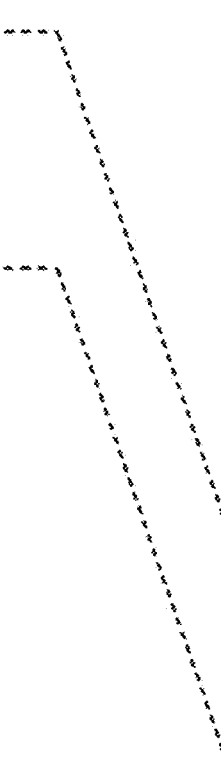

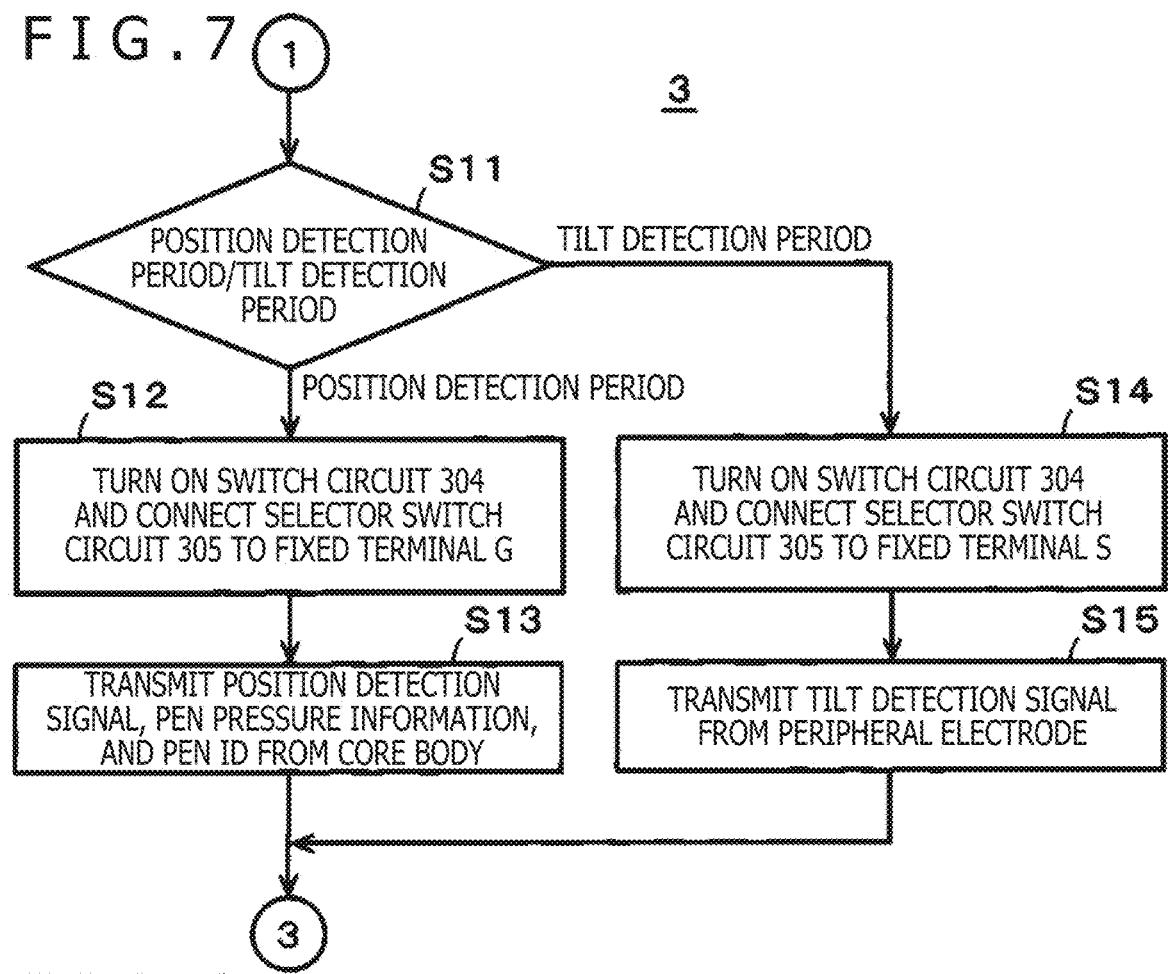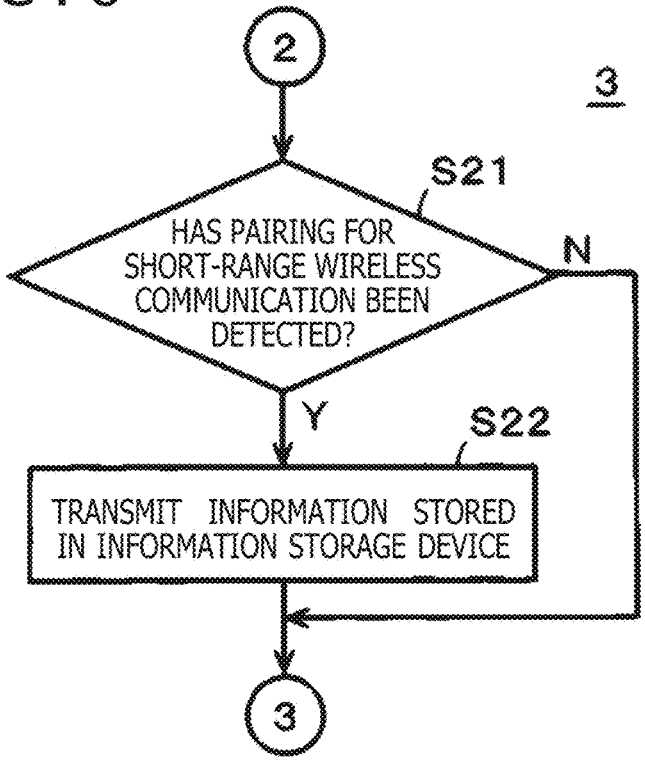

FIG.12
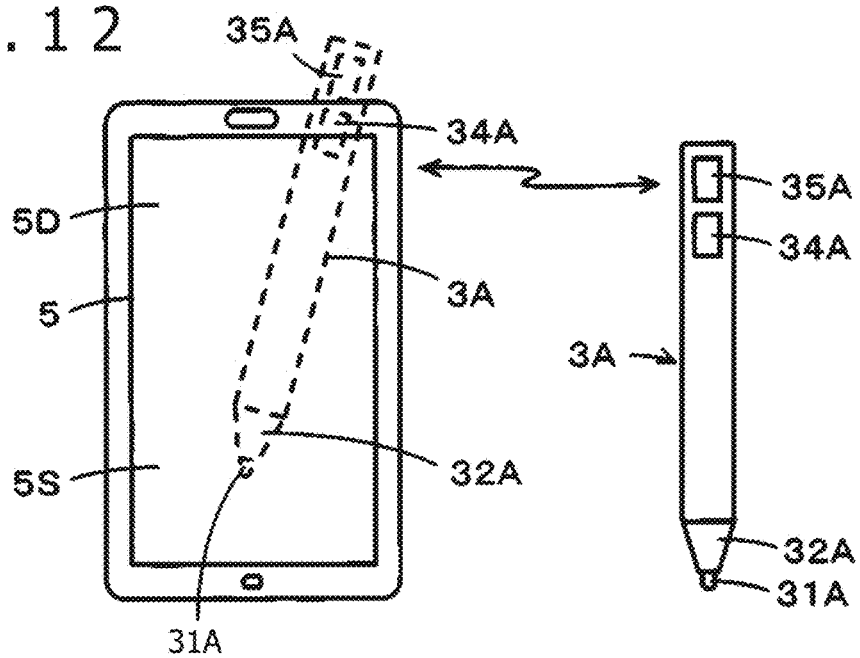
FIG.13A
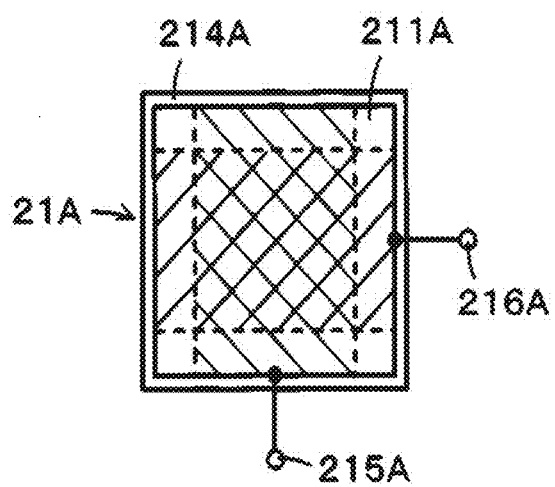
FIG.13B
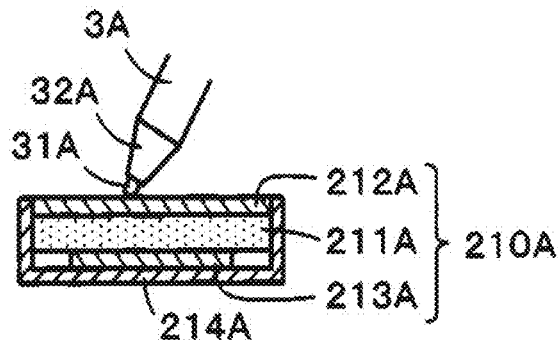
FIG.14
| PORT NUMBER | TRANSMISSION INFORMATION |
|---|---|
| P01 | INFO-1 |
| P02 | INFO-2 |
| P03 | INFO-3 |
| P04 | INFO-4 |

INFORMATION INPUT/OUTPUT SYSTEM FOR ACTIVE PEN WITH STORAGE

BACKGROUND

Technical Field

The present disclosure relates to an information input/output system including an indication operation device such as, for example, an electronic pen and an information processing device that performs processing corresponding to an indication input performed by the indication operation device.

Description of the Related Art

In recent years, there has been a system available in which various processes can be performed interactively between an indication operation device such as an electronic pen and an information processing device including a computer having a function for detecting an indication operation performed by the indication operation device. Examples of such function include a position detection function for detecting the position indicated by the electronic pen.

For example, Japanese Patent Laid-Open No. 2003-323455 (hereinafter referred to as "Patent Document 1") discloses a related information providing device that provides, according to the timing of indication to a subject in a video, related information that is appropriate at that timing for an information provider. The interactive system according to Patent Document 1 is convenient since an information processing device can acquire related information regarding information being processed according to an indication operation performed by an indication operation device and can use the related information for display and processing at that time.

Incidentally, it would be convenient if the information corresponding to the indication operation performed by the indication operation device could be transferred to another device for display or usage on the other device, in addition to being used for display or processing at that time on the information processing device side.

Conventionally, however, as with Patent Document 1, it has been generally assumed that the information corresponding to the indication operation performed by the indication operation device is used for processing on the information processing device side. Accordingly, in order to transfer such information, the information acquired according to the indication operation performed by the indication operation device needs to be temporarily stored in the information processing device and then stored in a universal serial bus (USB) memory or a card-type memory and taken out therefrom, transferred, and the like. In this way, the transfer of such information has involved troublesome operations.

BRIEF SUMMARY

Therefore, it is desirable to provide an information input/output system that can easily acquire information corresponding to an indication operation performed by an indication operation device and transfer the information to another device.

In order to solve the problems described above, there is provided an information input/output system including an indication operation device, and an information processing device including a sensor, in which the indication operation device includes a first electrode, a second electrode, a signal generation circuit which, in operation, generates a signal to be transmitted to the information processing device, a first transmission circuit which, in operation, transmits the signal from the signal generation circuit to the sensor of the information processing device through the first electrode or the second electrode, a reception circuit which, in operation, receives information from the information processing device through the first electrode or the second electrode, an information storage device which, in operation, stores the information received by the reception circuit, and a transmitter which, in operation, transmits the information stored in the information storage device to an outside of the indication operation device, and the information processing device includes a processor which, in operation, processes the signal received from the indication operation device through the sensor, an acquisition circuit which, in operation, acquires information corresponding to a result of the processing performed by the processor, and a second transmission circuit which, in operation, transmits the information acquired by the acquisition circuit to the indication operation device through the sensor.

In the information input/output system having the configuration described above, the indication operation device transmits a signal from the signal generation circuit to the sensor of the information processing device through the first electrode or the second electrode. When the information processing device receives the signal from the indication operation device through the sensor, the information processing device processes the received signal, acquires information corresponding to the result of the processing, and transmits the acquired information to the indication operation device through the sensor. The indication operation device receives the information from the information processing device through the first electrode or the second electrode and stores the received information in the information storage device. Accordingly, the indication operation device can transmit the information stored in the information storage device to the outside of the indication operation device through the transmitter.

Therefore, according to the information input/output system having the configuration described above, when the indication operation device transmits a signal to the information processing device through the sensor, the information processing device transmits a signal corresponding to the result of the processing of the received signal to the indication operation device through the sensor. Accordingly, the indication operation device can store information from the information processing device in the information storage device and appropriately transfer the information to another device or the like through the transmitter. That is, when the indication operation device transmits a signal through the sensor, the information processing device transmits predetermined information to the indication operation device through the sensor, so that the indication operation device can store and retain the information and transfer the information to another device. With a simple operation, therefore, the indication operation device can acquire information from the information processing device and transfer the information.

BRIEF DESCRIPTION OF THE SEVERAL VIEWS OF THE DRAWINGS

FIGS. 4A to 4E are diagrams for describing operations of the electronic pen as an example of the indication operation device included in the information input/output system according to the first embodiment of the present disclosure;

FIG. 7 is a diagram illustrating a part of the flowchart for describing the flow of the operations of the electronic pen as an example of the indication operation device included in the information input/output system according to the first embodiment of the present disclosure;

FIG. 8 is a diagram illustrating a part of the flowchart for describing the flow of the operations of the electronic pen as an example of the indication operation device included in the information input/output system according to the first embodiment of the present disclosure;

FIG. 12 is a diagram for describing an example of a configuration of an electronic pen as an example of an indication operation device included in the information input/output system according to the second embodiment of the present disclosure;

FIGS. 13A and 13B are views for describing an example of a configuration of a sensor of an information processing device included in the information input/output system according to the second embodiment of the present disclosure;

FIG. 14 is a diagram for describing an example of the configuration of the information processing device included in the information input/output system according to the second embodiment of the present disclosure;

DETAILED DESCRIPTION

Hereinafter, embodiments of an information input/output system according to the present disclosure will be described with reference to the drawings.

First Embodiment

Figure 1:
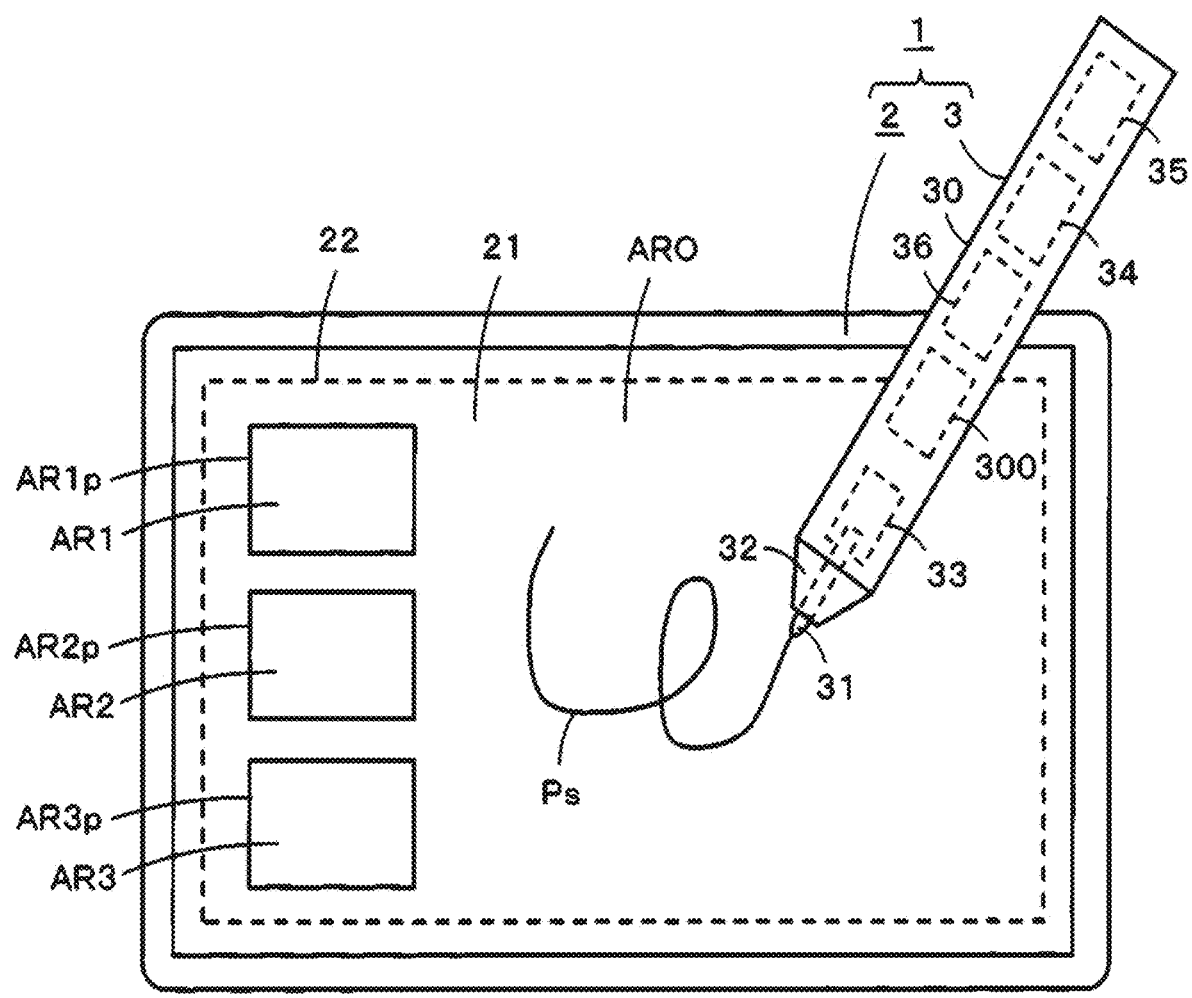
FIG. 1 is a diagram for describing an overview of an example of a configuration of an information input/output system according to a first embodiment of the present disclosure.

FIG. 1 is a diagram for describing an overview of an information input/output system according to a first embodiment of the present disclosure. As illustrated in FIG. 1, an information input/output system 1 according to the first embodiment includes, for example, an information processing device 2, which includes a personal computer, and an electronic pen 3, which is an example of an indication operation device. In the present embodiment, the information processing device 2 is configured as illustrated in FIG. 2, and the electronic pen 3 has an electronic circuit configuration illustrated in FIG. 3.

Example of Configuration of Information Processing Device 2

Figure 2:
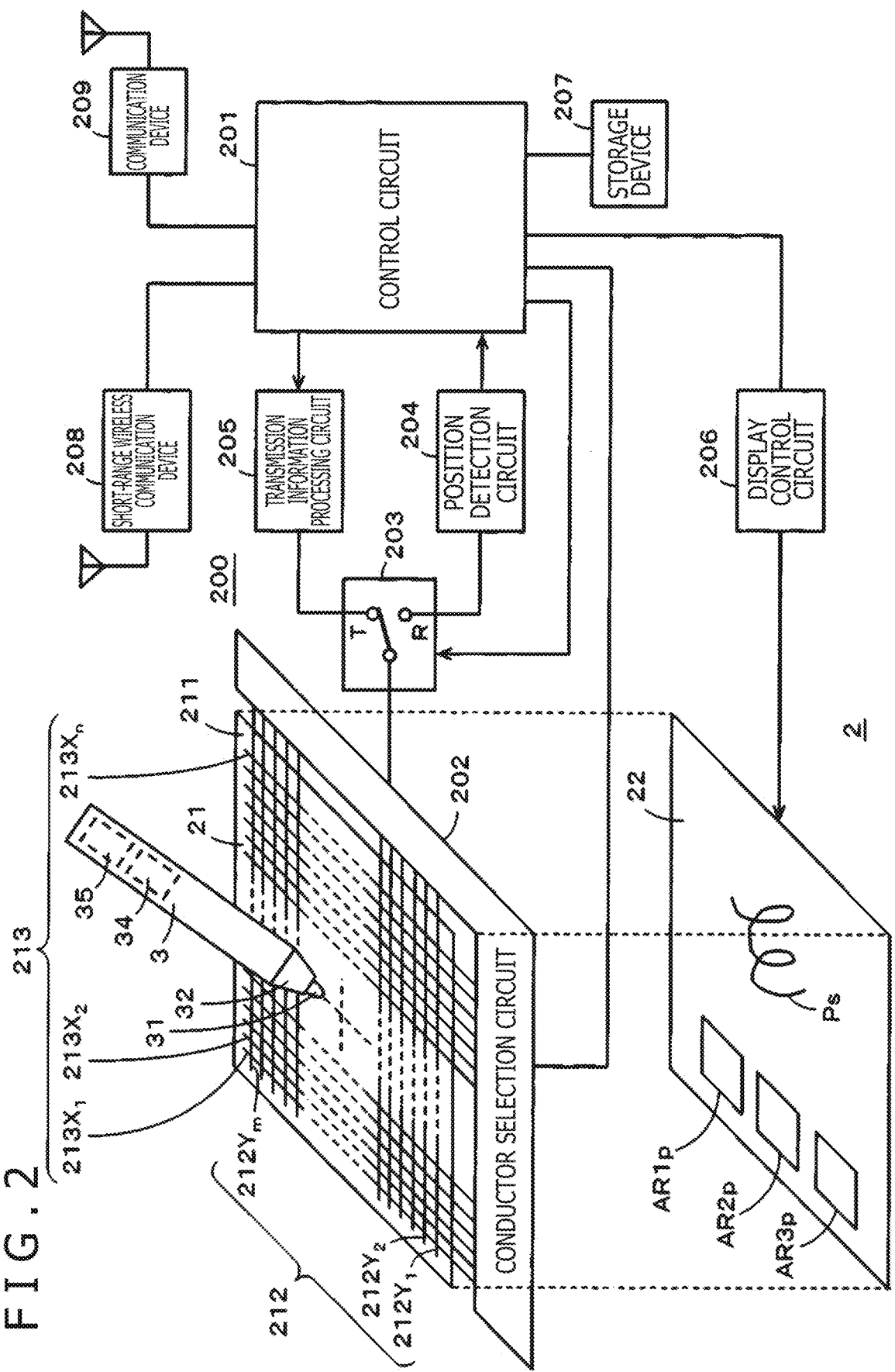
FIG. 2 is a diagram for describing an example of a configuration of an information processing device included in the information input/output system according to the first embodiment of the present disclosure.

As illustrated in FIGS. 1 and 2, the information processing device 2 according to the present embodiment includes a position detection sensor 21 of a capacitance type and a display device 22. The position detection sensor 21 is an example of a sensor and is superimposed on the display device 22 so as to overlap therewith. The display device 22 includes, for example, a flat display device such as a liquid-crystal display or an organic electroluminescence (EL).

As illustrated in FIG. 2, the position detection sensor 21 is disposed so as to overlap with a front surface of a display screen of the display device 22. In this case, a position detection region of the position detection sensor 21 is disposed so as to substantially match a display region of the display screen of the display device 22. In FIG. 1, the display region of the display screen of the display device 22 is denoted by a dotted line.

In this example, the position detection sensor 21 includes a rectangular sheet-shaped transparent substrate 211, which corresponds to the display screen of the display device 22. In this example, the transparent substrate 211 includes, on its front surface, a first conductor group 212 and a second conductor group 213. The first conductor group 212 includes a plurality of first conductors $212Y_1, 212Y_2, \ldots,$ and $212Y_m$ (m is an integer of 1 or greater), each of which extends in the horizontal direction (X-axis direction). The plurality of first conductors $212Y_1, 212Y_2, \ldots,$ and $212Y_m$ are disposed parallel to each other in the Y-axis direction at predetermined intervals. The second conductor group 213 includes a plurality of second conductors $213X_1, 213X_2, \ldots,$ and $213X_n$ (n is an integer of 1 or greater), each of which extends in the vertical direction (Y-axis direction) perpendicular to the horizontal direction. The plurality of second conductors $213X_1, 213X_2, \ldots,$ and $213X_n$ are disposed parallel to each other in the X-axis direction at predetermined intervals. In the following description, when there is no need to distinguish between the plurality of first conductors $212Y_1, 212Y_2, \ldots,$ and $212Y_m$, the plurality of first conductors $212Y_1, 212Y_2, \ldots,$ and $212Y_m$ will be referred to as a first conductor 212Y. Similarly, when there is no need to distinguish between the plurality of second conductors $213X_1, 213X_2, \ldots,$ and $213X_n$, the plurality of second conductors $213X_1, 213X_2, \ldots,$ and $213X_n$ will be referred to as a second conductor 213X.

The position detection sensor 21 and the display device 22 are connected to a processing circuit 200 of the information processing device 2. The processing circuit 200 has a configuration in which a conductor selection circuit 202, a selector switch circuit 203, a position detection circuit 204, a transmission information processing circuit 205, a display control circuit 206, a storage device 207, a short-range wireless communication device 208, and a communication device 209 are connected to a control circuit 201, which controls the entire information processing device 2.

Each of the plurality of conductors of the first conductor group 212 and the second conductor group 213 of the position detection sensor 21 is connected to the conductor selection circuit 202. The conductor selection circuit 202 selects one or a plurality of conductors among the plurality of conductors of the first conductor group 212 and the second conductor group 213 according to a control signal from the control circuit 201.

The conductor selection circuit 202 is connected to the selector switch circuit 203. A selector control signal from the control circuit 201 causes switching in the selector switch circuit 203 when a signal is received from the position detection sensor 21 (reception mode) and when information is transmitted from the position detection sensor 21 (transmission mode).

As will be described later, in the reception mode in which the position detection sensor 21 receives a signal from the electronic pen 3, the selector switch circuit 203 is switched to a terminal R according to the selector control signal from the control circuit 201 such that a conductor selected by the conductor selection circuit 202 is connected to an input terminal of the position detection circuit 204. In the transmission mode in which information is transmitted from the position detection sensor 21, the selector switch circuit 203 is switched to a terminal T according to the selector control signal from the control circuit 201 such that a conductor selected by the conductor selection circuit 202 is connected to an output terminal of the transmission information processing circuit 205. In the present embodiment, the control circuit 201 of the information processing device 2 is configured to synchronize the timing with the electronic pen 3 and execute the transmission mode and the reception mode in a time-division manner, as will be described later.

The position detection circuit 204 detects the signal level of the received signal supplied from each conductor selected by the conductor selection circuit 202, thereby detecting the position indicated by the electronic pen 3 from the result of the detection. Then, the position detection circuit 204 supplies information regarding the detected position to the control circuit 201. The control circuit 201 performs processing to be described later on the basis of the received information regarding the position indicated by the electronic pen 3.

In the present embodiment, the position detection circuit 204 performs a process of detecting pen pressure information and pen identification information (hereinafter referred to as "pen ID") transmitted from the electronic pen 3 based on the received signal supplied from each conductor selected by the conductor selection circuit 202 and supplying the detected pen pressure information and pen ID to the control circuit 201. Further, the position detection circuit 204 also performs a process of detecting the tilt of the electronic pen 3 based on the received signal supplied from each conductor selected by the conductor selection circuit 202 and supplying information regarding the detected tilt to the control circuit 201.

The transmission information processing circuit 205 converts (modulates) transmission information supplied from the control circuit 201 into a signal suitable for transmission to the electronic pen 3 through the position detection sensor 21 and supplies the converted (modulated) signal to the conductor selected by the conductor selection circuit 202 through the selector switch circuit 203, thereby transmitting the signal to the electronic pen 3.

The display control circuit 206 is connected to the display device 22. The display control circuit 206 receives display image information from the control circuit 201 and performs control to display a display image corresponding to the display image information on the display screen of the display device 22.

The storage device 207 stores and reads out information on the basis of the control by the control circuit 201. In the present embodiment, a plurality of partial detection areas are preset in a detection region of the position detection sensor 21. The detection region of the position detection sensor 21 corresponds to the display region of the display device 22. In the example of FIG. 1, three rectangular partial detection areas AR1, AR2, and AR3 are set in the detection region of the position detection sensor 21. In the present embodiment, an area AR0 other than these three partial detection areas AR1, AR2, and AR3 serves as a writing input detection area in which a writing input made by the electronic pen 3 is detected. As illustrated in FIGS. 1 and 2, area frame images AR1$p$, AR2$p$, and AR3$p$ by which the user can visually recognize the partial detection areas AR1, AR2, and AR3 are displayed on the display screen of the display device 22.

In the present embodiment, different function processes are set in advance in association with the individual areas in the detection region. Specifically, the control circuit 201 performs different function processes depending on which area of the detection region of the position detection sensor 21 the position indicated by the electronic pen 3 is. The storage device 207 includes storage regions, each of which is associated with a corresponding one of the writing input detection area AR0 and the partial detection areas AR1, AR2, and AR3.

The control circuit 201 performs different processing controls depending on which area of the detection region of the position detection sensor 21 the position indicated by the electronic pen 3 is. The control circuit 201 also performs processing control to write or read out information on the storage region of the storage device 207 associated with the area. A processing control program for performing these processing controls is installed in the control circuit 201.

Examples of the function processes set in association with the writing input detection area AR0 and the partial detection areas AR1, AR2, and AR3 within the detection region of the position detection sensor 21 will be described in detail later. The partial detection areas are not limited to these three partial detection areas AR1, AR2, and AR3 as in this example, and the number of partial detection areas may be one, two, or four or more. Further, each partial detection area may have any size and shape. For example, the position, size, and shape of each partial detection area can be specified by the electronic pen 3 on the position detection sensor 21. Moreover, for example, the information processing device 2 can display a list of menus of the functions that can be set in the respective partial detection areas on the display screen of the display device 22, and the functions to be set can be selected and indicated by the electronic pen 3 from the list.

The short-range wireless communication device 208 wirelessly communicates with a short-range wireless communication device disposed in the electronic pen 3 as will be described later. In the present embodiment, the short-range wireless communication device 208 is configured as a wireless communication device complying with the Bluetooth (registered trademark) standard. The control circuit 201 performs a process of storing information acquired through the short-range wireless communication device 208 in the storage device 207 and also performs a process of supplying an image corresponding to the acquired information to the display control circuit 206 to display the image on the display screen of the display device 22.

In the present embodiment, the communication device 209 connects to the Internet through a communication line and also performs communication (e.g., email) with a specific destination. The control circuit 201 performs a process of storing information acquired through the communication device 209 in the storage device 207 and also performs a process of supplying an image corresponding to the acquired information to the display control circuit 206 to display the image on the display screen of the display device 22.

Example of Configuration of Electronic Pen 3

The electronic pen 3 according to the present embodiment has a capacitance type configuration in which the electronic pen 3 interacts with the capacitive position detection sensor 21 of the information processing device 2. The electronic pen 3 according to this example includes a pen-shaped tubular casing 30, as illustrated in FIG. 1. An end of the casing 30 in the axial direction thereof serves as the pen tip side. A core body (center electrode) 31, which constitutes a first electrode, and a peripheral electrode 32, which constitutes a second electrode, are disposed on the pen tip side. The peripheral electrode 32 is disposed so as to surround the core body 31 and is insulated from the core body 31. As illustrated in FIG. 1, the peripheral electrode 32 is tapered toward a tip of the core body 31.

Further, as denoted by dotted lines in FIG. 1, a pen pressure detector 33, which detects a pressure (pen pressure) applied to the tip of the core body 31, an information storage device 34, a short-range wireless communication device 35, a pen ID storage device 36, and an electronic pen circuit 300, which is disposed on a printed circuit board, not illustrated, are disposed in a hollow portion of the casing 30. The pen pressure detector 33 has a configuration of a well-known variable capacitor that detects, for example, the applied pen pressure as a change in capacitance.

Figure 3:
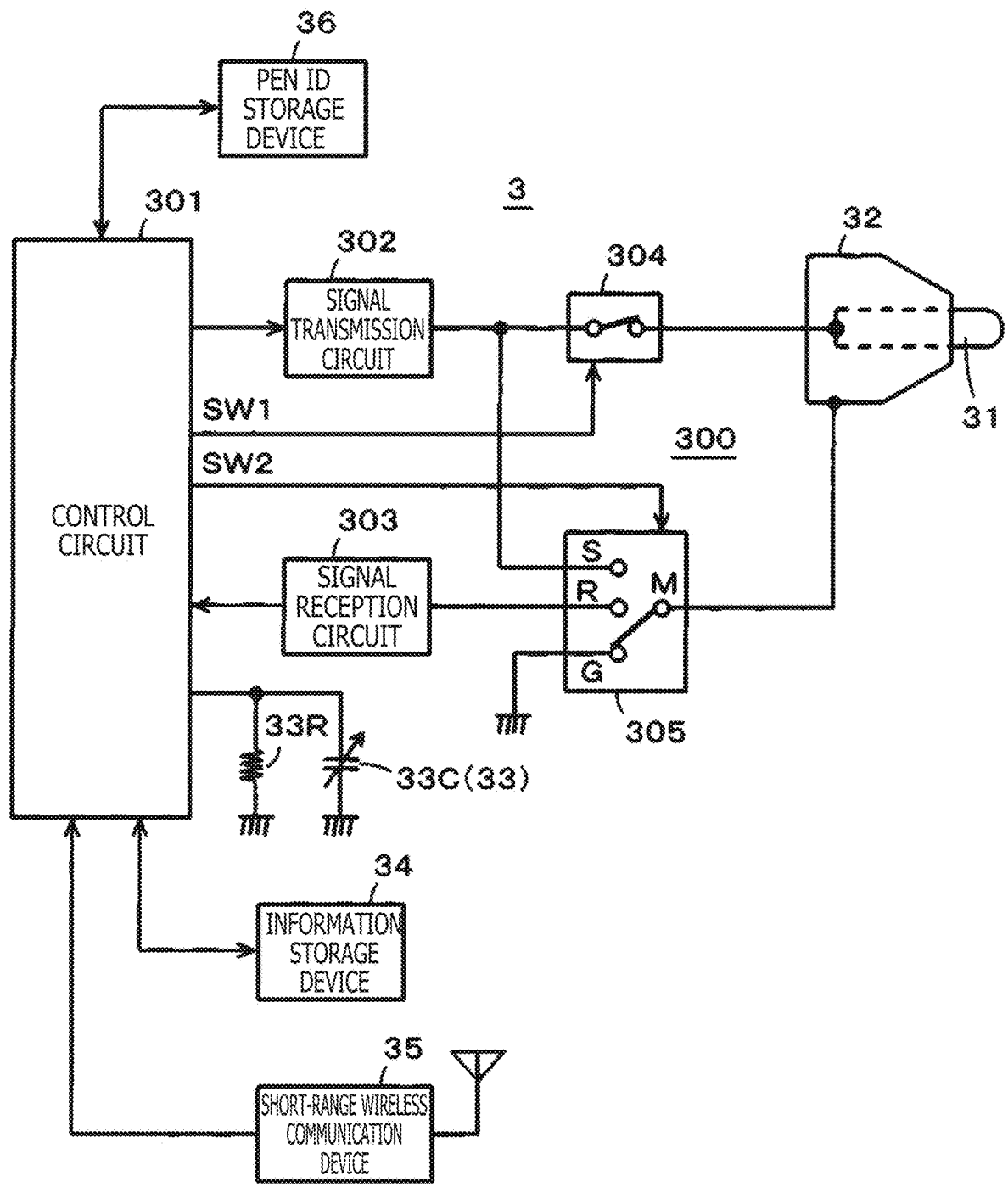
FIG. 3 is a diagram for describing an example of a configuration of an electronic pen as an example of an indication operation device included in the information input/output system according to the first embodiment of the present disclosure.

FIG. 3 is a circuit diagram for describing an example of a configuration of the electronic pen circuit 300 of the electronic pen 3 according to the present embodiment as well as a connection relation among the electronic pen circuit 300, the pen pressure detector 33, the information storage device 34, the short-range wireless communication device 35, and the pen ID storage device 36.

In this example, as illustrated in FIG. 3, the electronic pen circuit 300 includes a control circuit 301, which includes an integrated circuit (IC) mounted on the printed circuit board. A signal transmission circuit 302 and a signal reception circuit 303 are connected to the control circuit 301. A variable capacitor 33C, which is included in the pen pressure detector 33, is also connected to the control circuit 301. A resistor 33R is connected in parallel to the variable capacitor 33C. Further, the information storage device 34, the short-range wireless communication device 35, and the pen ID storage device 36 are connected to the control circuit 301.

A signal output terminal of the signal transmission circuit 302 is connected to the core body 31 through a switch circuit 304. Further, in this example, the signal output terminal of the signal transmission circuit 302 is connected to a terminal S of a selector switch circuit 305. A movable terminal M of the selector switch circuit 305 is connected to the peripheral electrode 32. A terminal R of the selector switch circuit 305 is connected to an input terminal of the signal reception circuit 303. A terminal G of the selector switch circuit 305 is connected to an earth electrode (ground electrode).

The control circuit 301 supplies a control signal SW1, which controls on/off of the switch circuit 304, to the switch circuit 304. The control circuit 301 supplies a selector control signal SW2, which switches the connection destination of the movable terminal M to the terminal S, the terminal R, or the terminal G, to the selector switch circuit 305.

The signal reception circuit 303 monitors whether or not a signal from the position detection sensor 21 is received through the peripheral electrode 32 when the selector switch circuit 305 is switched to the terminal R. When the signal reception circuit 303 does not detect the reception of the signal from the position detection sensor 21 through the peripheral electrode 32, the signal reception circuit 303 supplies this detection result to the control circuit 301. Then, when the signal reception circuit 303 detects the reception of the signal from the position detection sensor 21 through the peripheral electrode 32, the signal reception circuit 303 performs processing such as demodulation corresponding to the received signal and outputs a signal resulting from the processing to the control circuit 301.

The signal transmission circuit 302 outputs a signal including a position detection signal (burst signal) and additional information. This signal is transmitted from the core body 31. The position detection signal has a predetermined frequency for position detection performed by the position detection circuit 204 of the information processing device 2. The additional information includes pen pressure information, which corresponds to the pen pressure detected by the pen pressure detector 33, and the pen ID. Further, the signal transmission circuit 302 outputs a signal for detecting the tilt angle of the electronic pen 3. This signal is transmitted from the peripheral electrode 32. The tilt angle of the electronic pen 3 is the angle in the axial direction of the electronic pen 3 with respect to the detection surface of the position detection sensor 21.

The signal transmission circuit 302 generates and transmits a signal to be transmitted from the core body 31 and a signal to be transmitted from the peripheral electrode 32 under the control by the control circuit 301. In this case, the control circuit 301 causes the variable capacitor 33C to charge and discharge during a period in which the signal transmission circuit 302 transmits a burst signal for position detection as a signal to be transmitted from the core body 31. The control circuit 301 measures a period from the start of the discharge until the voltage across the variable capacitor 33C reaches a predetermined voltage, thereby detecting the capacitance of the variable capacitor 33C at that time. Based on the detected capacitance, the control circuit 301 detects the pen pressure.

Then, the control circuit 301 converts the detected pen pressure into, in this example, a multi-bit digital signal, and then controls the signal transmission circuit 302 to cause the signal transmission circuit 302 to output the pen pressure information corresponding to this digital signal, following the burst signal for position detection. Further, the control circuit 301 converts the pen ID read out from the pen ID storage device 36 into, in this example, a multi-bit digital signal, and controls the signal transmission circuit 302 to cause the signal transmission circuit 302 to output the pen ID, following the pen pressure information.

The information storage device 34 stores information received from the information processing device 2 through the position detection sensor 21 and the peripheral electrode 32 under the control by the control circuit 301. The information stored in the information storage device 34 is read out and then transmitted from the short-range wireless communication device 35 to the outside of the electronic pen 3 under the control by the control circuit 301. In this example, when the information stored in the information storage device 34 is transmitted from the short-range wireless communication device 35, the control circuit 301 checks the completion of the transmission and then erases the information stored in the information storage device 34.

It is noted that the information stored in the information storage device 34 is not necessarily erased automatically after the transmission thereof. For example, the electronic pen 3 may be provided with an operation unit such as a side switch, and the user may perform a specific operation as an erasure indication operation. For example, the user may long-press the operation unit as the erasure indication operation. In this case, the information stored in the information storage device 34 may be erased in response to the erasure indication operation.

The short-range wireless communication device 35 is an example of a transmitter and uses a wireless communication unit complying with, in this example, the Bluetooth (registered trademark) standard to wirelessly communicate with the short-range wireless communication device 208 of the information processing device 2, as described above. Needless to say, the short-range wireless communication device 35 can perform wireless communication not only with the information processing device 2 but also with any other personal computers and the like using a wireless communication unit complying with the Bluetooth (registered trademark) standard.

Although not illustrated in FIGS. 1 and 3, a power supply device including a primary battery or a secondary battery is disposed in the hollow portion of the casing 30 of the electronic pen 3, and a power supply voltage from the power supply device is supplied to each device under the control by the control circuit 301.

The operations of the electronic pen circuit 300 of the electronic pen 3 according to the present embodiment will be described with reference to FIGS. 4A to 4E.

In the electronic pen circuit 300 according to the present embodiment, when the electronic pen 3 and the position detection sensor 21 are not capacitive-coupled to each other, the control circuit 301 supplies the selector control signal SW2 to the selector switch circuit 305 to switch the selector switch circuit 305 to the terminal R (see FIG. 4E), thereby connecting the peripheral electrode 32 to the signal reception circuit 303 through the selector switch circuit 305. Then, the control circuit 301 monitors the reception of a signal from the position detection sensor 21 based on the output of the monitoring of the reception of the signal from the position detection sensor 21 supplied from the signal reception circuit 303 (see FIG. 4A). At this time, the control circuit 301 supplies the selector control signal SW1 to the switch circuit 304 to turn off the switch circuit 304 (see FIG. 4D).

In the present embodiment, the control circuit 301 and the signal reception circuit 303 do not constantly monitor a signal received from the position detection sensor 21. Instead, as illustrated in the first half of FIG. 4B, the control circuit 301 and the signal reception circuit 303 perform the signal monitoring only during an intermittent signal reception monitoring period which is repeated at a predetermined cycle.

When the control circuit 301 detects the reception of the signal from the position detection sensor 21 based on the output of the monitoring from the signal reception circuit 303, the control circuit 301 switches the electronic pen circuit 300 from a standby state to an active state and performs control to supply a power supply voltage from the power supply unit to each unit. Then, as illustrated in FIG. 4B, the control circuit 301 performs control to switch the operation mode of the electronic pen circuit 300 between a signal reception mode and a signal transmission mode in a time-division manner. In this case, the time division control starts from the signal reception mode.

In the signal reception mode, the control circuit 301 supplies the selector control signal SW2 to the selector switch circuit 305 to switch the selector switch circuit 305 to the fixed terminal R as illustrated in FIG. 4E. Therefore, the signal reception circuit 303 receives a signal transmitted from the position detection sensor 21 and received by the peripheral electrode 32 through the selector switch circuit 305, performs processing such as demodulation corresponding to the received signal, and outputs the signal resulting from the processing to the control circuit 301. In this signal reception mode, as illustrated in FIG. 4D, the control circuit 301 supplies the selector control signal SW1 to the switch circuit 304 to turn off the switch circuit 304 such that a signal is not transmitted from the core body 31 serving as the center electrode.

The control circuit 301 analyzes the signal received from the position detection sensor 21 on the basis of the signal from the signal reception circuit 303, determines the specifications of the information processing device 2 with which the electronic pen 3 is communicating, and on the basis of the determination result, determines the timing of signal interaction with the position detection sensor 21 of the information processing device 2 with which the electronic pen 3 is communicating. Then, the control circuit 301 controls the format of a signal to be output from the signal transmission circuit 302 such that the format matches the specifications of the information processing device 2 with which the electronic pen 3 is communicating, and interacts with the position detection sensor 21 at the determined timing.

Further, in the signal reception mode, when the control circuit 301 receives information transmitted from the information processing device 2 via the position detection sensor 21 and the peripheral electrode 32 and supplied from the signal reception circuit 303, the control circuit 301 also performs a process of storing the received information in the information storage device 34.

In the signal transmission mode, in the present embodiment, the control circuit 301 executes a position detection period Ta and a tilt detection period Tb in a time-division manner multiple times. In the position detection period Ta, a burst signal for position detection, pen pressure information, and pen ID are transmitted to the information processing device 2. In the tilt detection period Tb, the tilt angle of the electronic pen 3 is detected.

In the position detection period Ta, the control circuit 301 supplies the control signal SW1 to the switch circuit 304 to turn on the switch circuit 304 (see FIG. 4D), and supplies the selector control signal SW2 to the selector switch circuit 305 to connect the movable terminal M to the fixed terminal G (see FIG. 4E). Therefore, the peripheral electrode 32 is connected to the earth terminal.

Then, during the position detection period Ta, the signal transmission circuit 302 supplies, under the control by the control circuit 301, a signal including the position detection signal (burst signal) with a predetermined frequency for position detection performed by the information processing device 2, the pen pressure information corresponding to the pen pressure detected by the pen pressure detector 33, and the pen ID, to the core body 31 through the switch circuit 304 and transmits the signal to the position detection sensor 21 through capacitive coupling. At this time, since the peripheral electrode 32 is connected to the earth terminal, the earth terminal acts as a shield electrode for the core body 31 serving as the center electrode and prevents noise from entering the core body 31.

In the tilt detection period Tb, the control circuit 301 supplies the control signal SW1 to the switch circuit 304 to turn off the switch circuit 304 (see FIG. 4D), and supplies the selector control signal SW2 to the selector switch circuit 305 to connect the movable terminal M to the fixed terminal S (see FIG. 4E). Then, in the tilt detection period Tb, the signal transmission circuit 302 generates, under the control by the control circuit 301, a burst signal for detecting the tilt angle of the electronic pen 3 and transmits the burst signal from the peripheral electrode 32.

The position detection circuit 204 of the information processing device 2 detects the distribution of the detected positions of the signal from the peripheral electrode 32 on the position detection sensor 21 and then detects the tilt of the electronic pen 3 from the result of the detection.

Examples of Function Processes Set in Association with Respective Partial Detection Areas AR1, AR2, and AR3

Before describing the function processes set in association with the respective partial detection areas AR1, AR2, and AR3, a processing operation of the information processing device 2 when the position indicated by the electronic pen 3 is within the writing input detection area AR0 will be described.

In the present embodiment, when the position detection circuit 204 detects that the position indicated by the electronic pen 3 is within the writing input detection area AR0, the control circuit 201 of the information processing device 2 stores information regarding the detected indicated position in the storage region associated with the writing input detection area AR0 of the storage device 207 as writing input information. At this time, in the present embodiment, the pen pressure information and the pen ID transmitted from the electronic pen 3 are also stored as the writing input information. Then, the control circuit 201 generates image information representing a writing trace based on the information regarding the detected indicated position and supplies the image information to the display control circuit 206. Accordingly, the display control circuit 206 displays an image Ps representing the writing trace on the display screen of the display device 22 as illustrated in FIGS. 1 and 2. Further, the pen pressure information is reflected to, for example, the line thickness of the writing trace being displayed.

Next, examples of the function processes set in association with the respective partial detection areas AR1, AR2, and AR3 within the detection region of the position detection sensor 21 of the information processing device 2 in the present embodiment will be described.

In this example, the partial detection area AR1 is assigned a function of reading out writing input information that has been detected within the writing input detection area AR0 up to this point from the storage device 207 and transmitting the writing input information to the electronic pen 3. Specifically, in this example, when the position detection circuit 204 detects that the position indicated by the electronic pen 3 is within the partial detection area AR1, the control circuit 201 reads out the writing input information that has been detected within the writing input detection area AR0 up to this point from the storage device 207 and supplies the writing input information to the transmission information processing circuit 205.

In this case, in this example, the writing input information is read out from the storage region of the storage device 207 associated with the writing input detection area AR0. Therefore, in this example, it is not necessary to separately set the storage region associated with the partial detection area AR1 in the storage device 207, and the storage region associated with the writing input detection area AR0 also serves as the storage region associated with the partial detection area AR1. Alternatively, the storage region associated with the partial detection area AR1 may be set in the storage device 207 and the writing input information may also be stored in the set storage region such that the writing input information can be read out from this storage region.

Then, the control circuit 201 switches the selector switch circuit 203 to the terminal T and controls the conductor selection circuit 202 so as to select the first conductor 212Y and the second conductor 213X having an intersection point in the partial detection area AR1. Accordingly, the writing input information stored in the storage device 207 is transmitted to the electronic pen 3 located in the partial detection area AR1 of the position detection sensor 21. In the electronic pen 3, the peripheral electrode 32 receives the writing input information transmitted through the position detection sensor 21 and stores the writing input information in the information storage device 34.

By using the function assigned to this partial detection area AR1, the information processing device 2 can supply the information written and input by the electronic pen 3 to another information processing device on which the user can continue to perform the writing input.

Figure 5A:
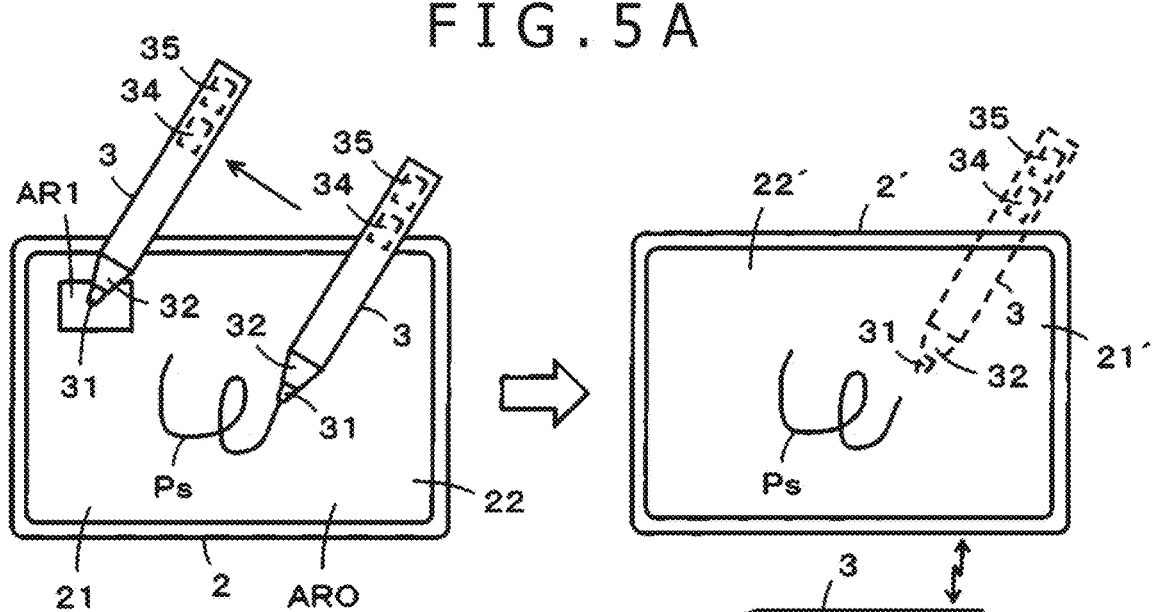
FIGS. 5A to 5C are diagrams for describing examples of processing operations in the information input/output system according to the first embodiment of the present disclosure.

For example, after the user performs the writing input forming the writing trace Ps in the writing input detection area AR0 on the position detection sensor 21 of the information processing device 2 with the electronic pen 3, the user moves the position indicated by the core body 31 of the electronic pen 3 to the partial detection area AR1, as illustrated on the left side of FIG. 5A. In this case, the information processing device 2 transmits the writing input information up to this point from the partial detection area AR1 of the position detection sensor 21 to the peripheral electrode 32 of the electronic pen 3. In response, the electronic pen 3 receives the writing input information through the peripheral electrode 32 and stores the writing input information in the information storage device 34.

Next, as illustrated on the right side of FIG. 5A, the user moves the electronic pen 3 in which the writing input information is stored in the information storage device 34 to the vicinity of another information processing device 2', which includes a communication device communicable with the short-range wireless communication device 35, so that short-range wireless communication can be performed between the electronic pen 3 and the information processing device 2'. Then, the electronic pen 3 reads out the writing input information stored in the information storage device 34 and transmits the writing input information to the information processing device 2'. Accordingly, in the information processing device 2', the writing trace Ps can be displayed on a display screen of a display device 22' of the information processing device 2' on the basis of the writing input information received from the electronic pen 3, and the user can continuously perform a writing input on the writing trace Ps on a position detection sensor 21' of the information processing device 2'.

The electronic pen 3 may transmit the writing input information stored in the information storage device 34 to the information processing device 2' not from the short-range wireless communication device 35 but from the core body 31 or the peripheral electrode 32 through the position detection sensor 21' as denoted by a dotted line on the right side of FIG. 5A.

In this case, when the information processing device 2' detects electric-field coupling between the position detection sensor 21' and the electronic pen 3, the information processing device 2' transmits a request for acquisition of the storage information stored in the information storage device 34 to the electronic pen 3 and receives, through the position detection sensor 21', the storage information transmitted from the electronic pen 3 in response to the acquisition request. When the electronic pen 3 receives the request for acquisition of the storage information stored in the information storage device 34 from the information processing device 2', the electronic pen 3 determines whether or not the storage information to be transferred exists in the information storage device 34. When the storage information to be transferred exists, the electronic pen 3 reads out the storage information from the information storage device 34 and transmits the storage information through the position detection sensor 21'. When the storage information to be transferred does not exist, the electronic pen 3 transmits information indicating that the storage information to be transferred does not exist through the position detection sensor 21'.

Alternatively, the electronic pen 3 may transmit the storage information stored in the information storage device 34 to the information processing device 2' through the position detection sensor 21' not when the electronic pen 3 receives the acquisition request from the information processing device 2', but when the electronic pen 3 detects electric-field coupling to the position detection sensor 21' of the information processing device 2'.

Next, in this example, the partial detection area AR2 is assigned a function of reading out information stored in association with the pen ID from the storage device 207 and transmitting the information to the electronic pen 3. When it is assumed that different users use different electronic pens 3, the pen ID is equivalent to the user identification information. Therefore, in this example, information that needs to be communicated to each user is stored in advance in the storage region associated with the partial detection area AR2 of the storage device 207 in association with the pen ID of the electronic pen 3 used by each user. The information that needs to be communicated to each user may be information input by the electronic pen 3 with a specified destination that is managed by the information processing device 2 in association with the pen ID or information acquired through the communication device 209. In this case, the information acquired through the communication device 209 is information regarding a received email and includes received information addressed to the receiver that is managed by the information processing device 2 in association with the pen ID.

By using the function assigned to the partial detection area AR2, the information processing device 2 can transfer information, which has been prepared in advance in association with a user of a specific electronic pen 3, to this user. The user of the electronic pen 3 can display and view the transferred information on the information processing device 2', which is a different information processing device from the information processing device 2.

Figure 5B:
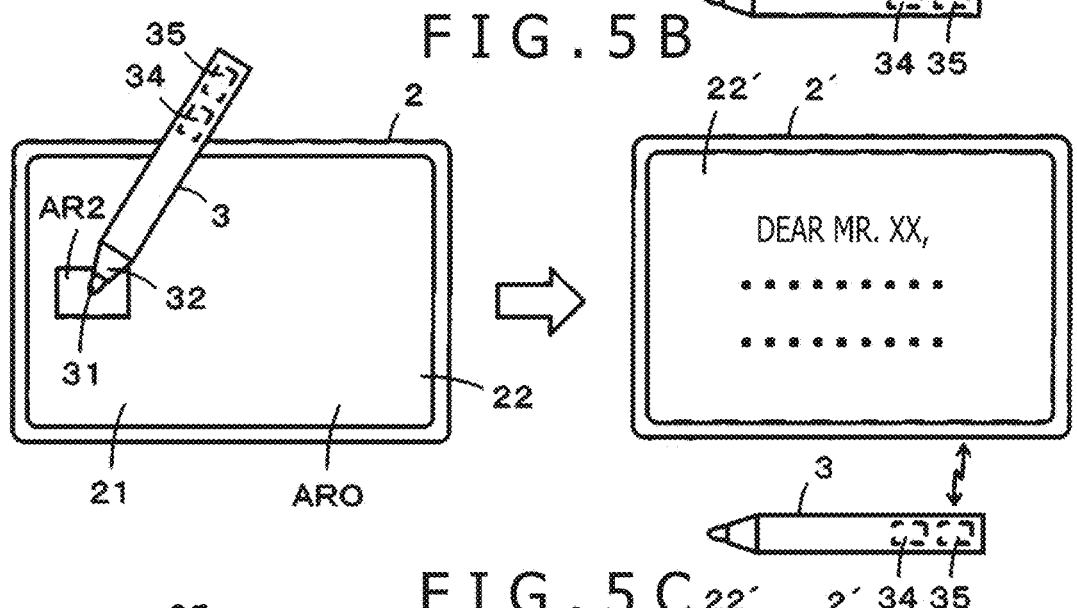

That is, as illustrated on the left side of FIG. 5B, when the user moves the position indicated by the core body 31 of the electronic pen 3 on the position detection sensor 21 of the information processing device 2 to the partial detection area AR2, the information processing device 2 transmits information corresponding to the pen ID of the electronic pen 3 from the partial detection area AR2 of the position detection sensor 21 to the peripheral electrode 32 of the electronic pen 3. Accordingly, the electronic pen 3 receives the information corresponding to the pen ID through the peripheral electrode 32 and stores the information in the information storage device 34.

Next, as illustrated on the right side of FIG. 5B, the user moves the electronic pen 3 in which the information corresponding to the pen ID is stored in the information storage device 34 to the vicinity of the information processing device 2', which includes the communication device capable of communicating with the short-range wireless communication device 35, so that short-range wireless communication can be performed between the electronic pen 3 and the information processing device 2'. In response, the electronic pen 3 reads out the information stored in the information storage device 34 and transmits the information to the information processing device 2'. Accordingly, the information processing device 2' can display the information corresponding to the pen ID on the display screen of the display device 22' based on the information received from the electronic pen 3. Therefore, the user can view the information, which has been prepared for the user by the information processing device 2, on the information processing device 2', which is a different information processing device from the information processing device 2.

Although not illustrated, in the case of the example of FIG. 5B as well, when the information processing device 2' includes the position detection sensor 21', the electronic pen 3 may transmit the information corresponding to the pen ID stored in the information storage device 34 to the information processing device 2' not from the short-range wireless communication device 35 but from the core body 31 or the peripheral electrode 32 through the position detection sensor 21'.

Next, in this example, the partial detection area AR3 is assigned a function of reading out information stored in association with a predetermined keyword from the storage device 207 and transmitting the information to the electronic pen 3. In this example, the correspondence information between one or a plurality of predetermined keywords and information corresponding to each of the keywords is stored in advance in the storage region of the storage device 207 associated with the partial detection area AR3. In this case, information to be stored in association with a keyword may be information input by the electronic pen 3 or information acquired through the communication device 209.

By using the function assigned to the partial detection area AR3, information corresponding to a keyword can be transferred from the information processing device 2 to the electronic pen 3. The user of the electronic pen 3 can display and view the transferred information on the information processing device 2', which is a different information processing device from the information processing device 2.

Figure 5C:
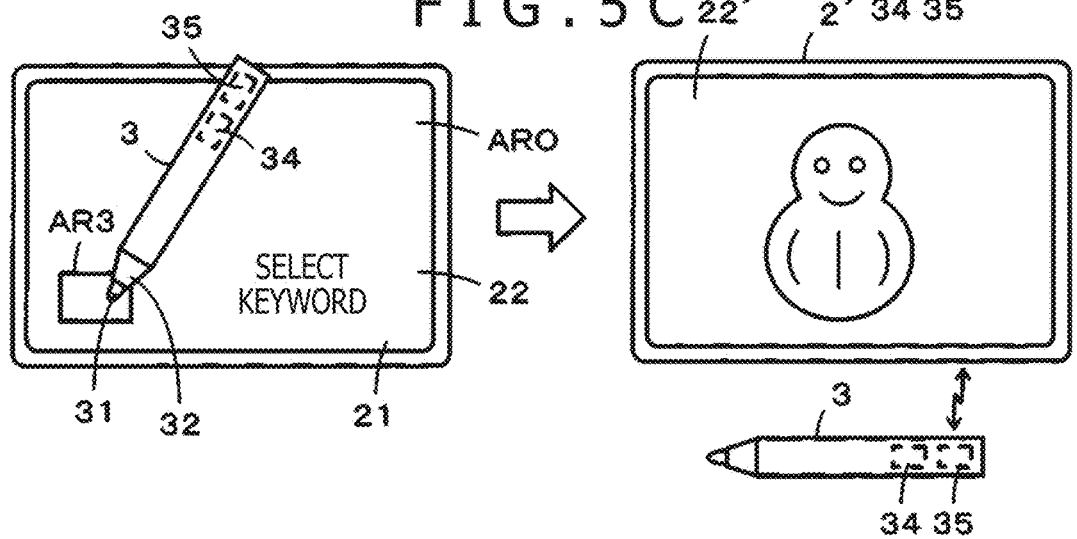

As illustrated on the left side of FIG. 5C, when the user moves the position indicated by the core body 31 of the electronic pen 3 to the partial detection area AR3 on the position detection sensor 21 of the information processing device 2, the information processing device 2 displays, in this example, a message, which prompts the user to select and input a keyword, within the display area corresponding to the writing input detection area AR0, while displaying a list of keywords stored in the storage device 207 within the display area, not illustrated, corresponding to the partial detection area AR3.

When a keyword is selected by the electronic pen 3 from the list of keywords, the information processing device 2 transmits information corresponding to the keyword from the partial detection area AR3 of the position detection sensor 21 to the peripheral electrode 32 of the electronic pen 3. The electronic pen 3 receives the information corresponding to the selected keyword through the peripheral electrode 32 and stores the information in the information storage device 34. The electronic pen 3 may select a plurality of keywords. In this case, the information processing device 2 transmits pieces of information corresponding to the selected keywords to the electronic pen 3, and the electronic pen 3 stores these pieces of information in the information storage device 34.

Next, as illustrated on the right side of FIG. 5C, the user moves the electronic pen 3 in which the information corresponding to the keyword is stored in the information storage device 34 to the vicinity of the information processing device 2', which includes the communication device capable of communicating with the short-range wireless communication device 35, so that short-range wireless communication can be performed between the electronic pen 3 and the information processing device 2'. In response, the electronic pen 3 reads out the information stored in the information storage device 34 and transmits the information to the information processing device 2'. Accordingly, the information processing device 2' can display the information corresponding to the keyword on the display screen of the display device 22' based on the information received from the electronic pen 3. Therefore, the user can view the information corresponding to the keyword, which has been prepared by the information processing device 2, on the information processing device 2', which is a different information processing device from the information processing device 2.

Although not illustrated, in the case of the example of FIG. 5C as well, when the information processing device 2' includes the position detection sensor 21', the electronic pen 3 may transmit the information corresponding to the keyword stored in the information storage device 34 to the information processing device 2' not from the short-range wireless communication device 35 but from the core body 31 or the peripheral electrode 32 through the position detection sensor 21'.

The position indicated by the electronic pen 3 is not necessarily limited to one of the positions of the partial detection areas AR1 to AR3. Instead, the electronic pen 3 may indicate the positions of some or all of the partial detection areas AR1 to AR3 such that pieces of information corresponding to the respective partial detection areas indicated by the electronic pen 3 can be all stored in the information storage device 34.

Needless to say, the information processing device 2' does not need to have the same configuration as the information processing device 2. However, it is preferable that the information processing device 2' to which writing input information is transferred include the position detection sensor 21'. Meanwhile, the information processing device 2' to which information corresponding to the pen ID in the example of FIG. 5B or information corresponding to a keyword in the example of FIG. 5C is transferred does not need to include the position detection sensor 21', and it suffices that the information processing device 2' includes at least the display device 22' including the display screen on which such information is displayed.

Operations of Electronic Pen 3 and Information Processing Device 2

Next, a flow of processing operations in the electronic pen 3 and the information processing device 2 for realizing the above-described functions will be described.

Example of Operations of Electronic Pen 3

Figure 6:
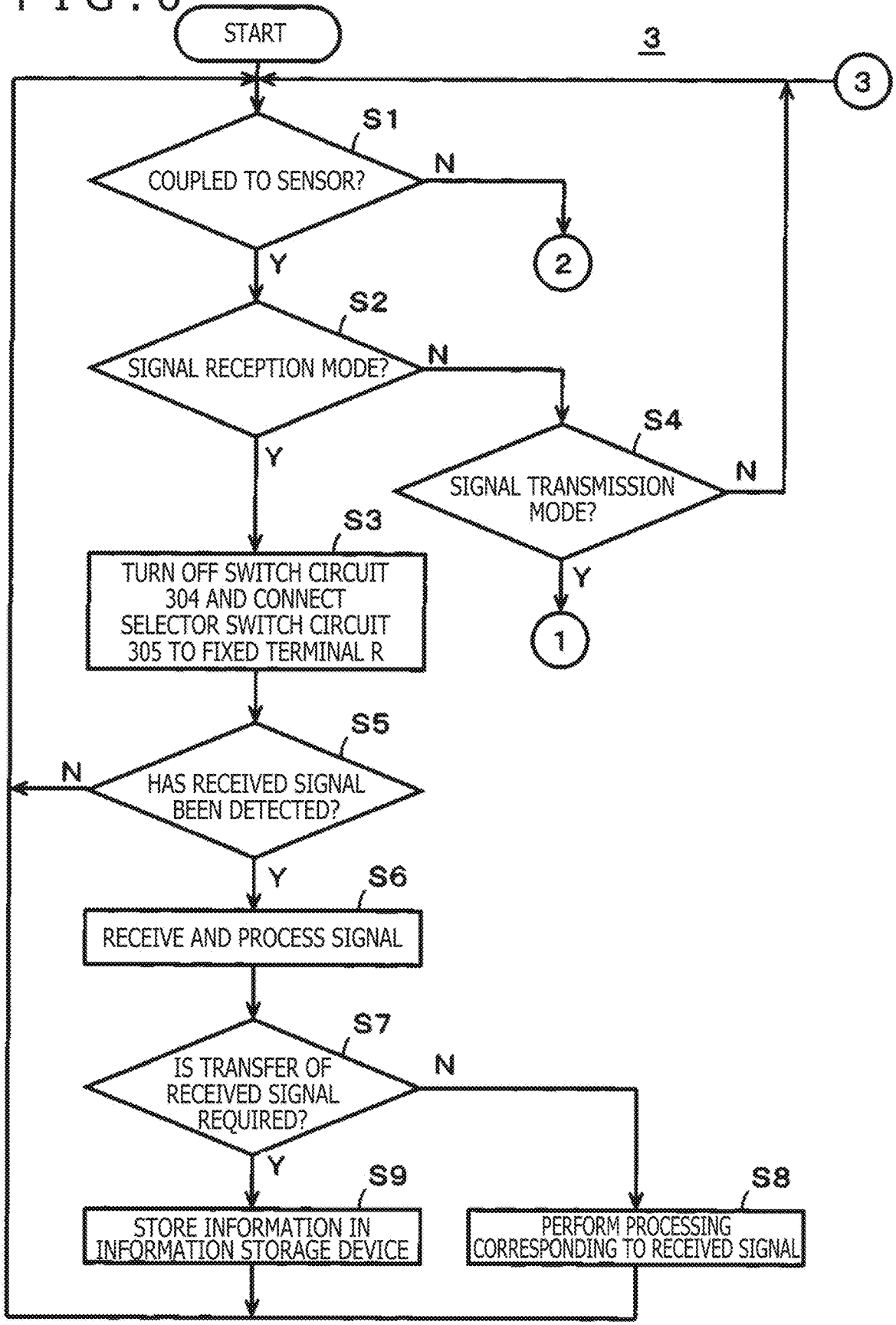
FIG. 6 is a diagram illustrating a part of a flowchart for describing a flow of operations of the electronic pen as an example of the indication operation device included in the information input/output system according to the first embodiment of the present disclosure.

FIGS. 6 to 8 are diagrams each illustrating a flowchart for describing an example of a processing flow for realizing operations including the above-described function processes in the electronic pen circuit 300 of the electronic pen 3. The operation at each box of this flowchart is performed by the control circuit 301 of the electronic pen circuit 300.

The control circuit 301 determines whether or not the electronic pen 3 is in the state of performing electric-field coupling to the position detection sensor 21 of the information processing device 2 (S1). When the electronic pen 3 is in the state of performing electric-field coupling to the position detection sensor 21 of the information processing device 2, signal interaction can be performed between the electronic pen 3 and the information processing device 2. This state includes not only the state in which the core body 31 of the electronic pen 3 is in contact with the detection surface of the position detection sensor 21 but also the hovering state in which the core body 31 of the electronic pen 3 is close to but slightly apart from the detection surface.

When the control circuit 301 determines at S1 that the electronic pen 3 is in the state of performing electric-field coupling to the position detection sensor 21 of the information processing device 2, the control circuit 301 determines whether or not the electronic pen 3 is in the period of the signal reception mode (S2). When the control circuit 301 determines at S2 that the electronic pen 3 is not in the period of the signal reception mode, the control circuit 301 determines whether or not the electronic pen 3 is in the period of the signal transmission mode (S4). Then, when the control circuit 301 determines at S4 that the electronic pen 3 is not in the period of the signal transmission mode, the control circuit 301 returns to S1 and repeats the processing from S1.

Then, when the control circuit 301 determines at S4 that the electronic pen 3 is in the period of the signal transmission mode, the control circuit 301 determines whether the electronic pen 3 is in the position detection period Ta or the tilt detection period Tb (S11 of FIG. 7). When the control circuit 301 determines at S11 that the electronic pen 3 is in the position detection period Ta, the control circuit 301 performs switching control to turn on the switch circuit 304 and connect the selector switch circuit 305 to the terminal G (S12). Next, the control circuit 301 performs control to cause the signal transmission circuit 302 to transmit a position detection signal, pen pressure information, and pen ID through the core body 31 serving as the center electrode (S13). After S13, the control circuit 301 returns to S1 and repeats the processing from S1.

When the control circuit 301 determines at S11 that the electronic pen 3 is in the tilt detection period Tb, the control circuit 301 performs switching control to turn off the switch circuit 304 and connect the selector switch circuit 305 to the terminal S (S14). Next, the control circuit 301 performs control to cause the signal transmission circuit 302 to transmit a tilt detection signal through the peripheral electrode 32 (S15). After S15, the control circuit 301 returns to S1 and repeats the processing from S1.

When the control circuit 301 determines at S2 of FIG. 6 that the electronic pen 3 is in the period of the signal reception mode, the control circuit 301 performs switching control to turn off the switch circuit 304 and connect the selector switch circuit 305 to the terminal R (S3). Next, the control circuit 301 determines whether or not a received signal has been detected on the basis of the output of the signal reception circuit 303 (S5). When the control circuit 301 determines at S5 that no received signal has been detected, the control circuit 301 returns to S1 and repeats the processing from S1.

Then, when the control circuit 301 determines at S5 that a received signal has been detected, the control circuit 301 receives and processes the signal transmitted through the position detection sensor 21 and the peripheral electrode 32 (S6). Then, the control circuit 301 determines through the processing of S6 whether or not the received signal includes information that needs to be transferred (S7). The control circuit 301 determines whether or not the received signal includes information that needs to be transferred on the basis of whether or not the received signal is any of a signal corresponding to the specifications of the information processing device 2 and a timing control signal. When the control circuit 301 determines that the received signal is not any of the signal corresponding to the specifications of the information processing device 2 and the timing control signal, the control circuit 301 determines that the received signal includes information that needs to be transferred. Alternatively, information transmitted from the information processing device 2 may include information indicating whether or not the information needs to be transferred, and based on the information, the electronic pen 3 may determine whether or not the received signal includes information that needs to be transferred.

Then, when the control circuit 301 determines at S7 that the received signal is any of the signal corresponding to the specifications of the information processing device 2 and the timing control signal and does not include information that needs to be transferred, the control circuit 301 performs control corresponding to the received signal (S8). For example, according to the received signal, the control circuit 301 performs control such that the specifications of the electronic pen 3 correspond to the specifications of the information processing device 2 and also controls the timing for time-division processing.

Further, when the control circuit 301 determines at S7 that the received signal includes information that needs to be transferred, the control circuit 301 performs a process of storing the information received from the information processing device 2 in the information storage device 34 (S9). After S9, the control circuit 301 returns to S1 and repeats the processing from S1.

When the control circuit 301 determines at S1 that the electronic pen 3 is not in the state of performing electric-field coupling to the position detection sensor 21 of the information processing device 2, the control circuit 301 determines whether or not pairing for short-range wireless communication has been established with another device (S21 of FIG. 8). When the control circuit 301 determines at S21 that pairing for short-range wireless communication has not been established with another device, the control circuit 301 returns to S1 and repeats the processing from S1.

When the control circuit 301 determines at S21 that pairing for short-range wireless communication has been established with the other device, the control circuit 301 reads out information stored in the information storage device 34 and transmits the information to the other device paired with the electronic pen 3 (S22). After the transmission, the control circuit 301 returns to S1 and repeats processing from S1.

Example of Operations of Information Processing Device 2

Figure 9:
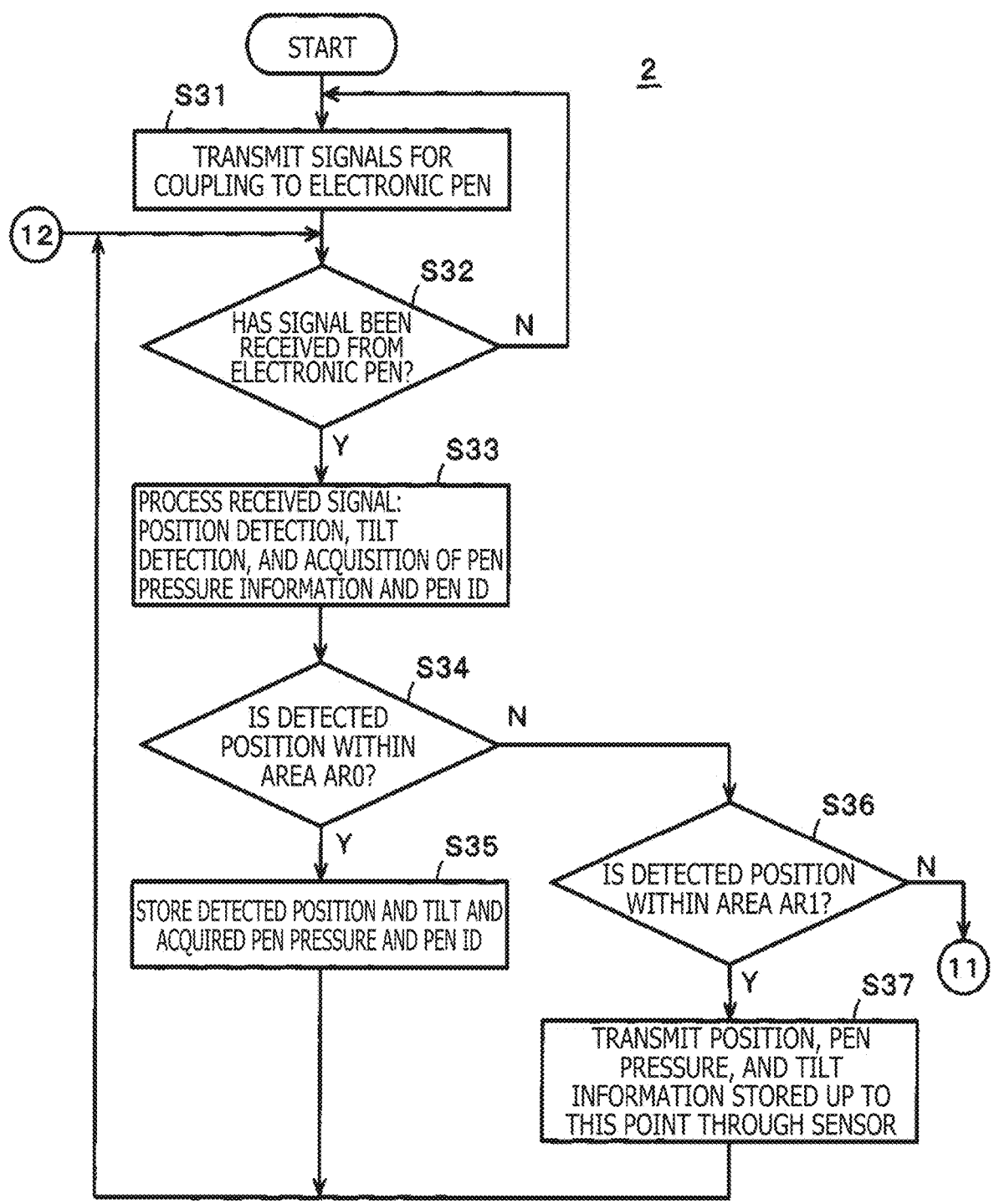
FIG. 9 is a diagram illustrating a part of a flowchart for describing a flow of operations of the information processing device included in the information input/output system according to the first embodiment of the present disclosure.
Figure 10:
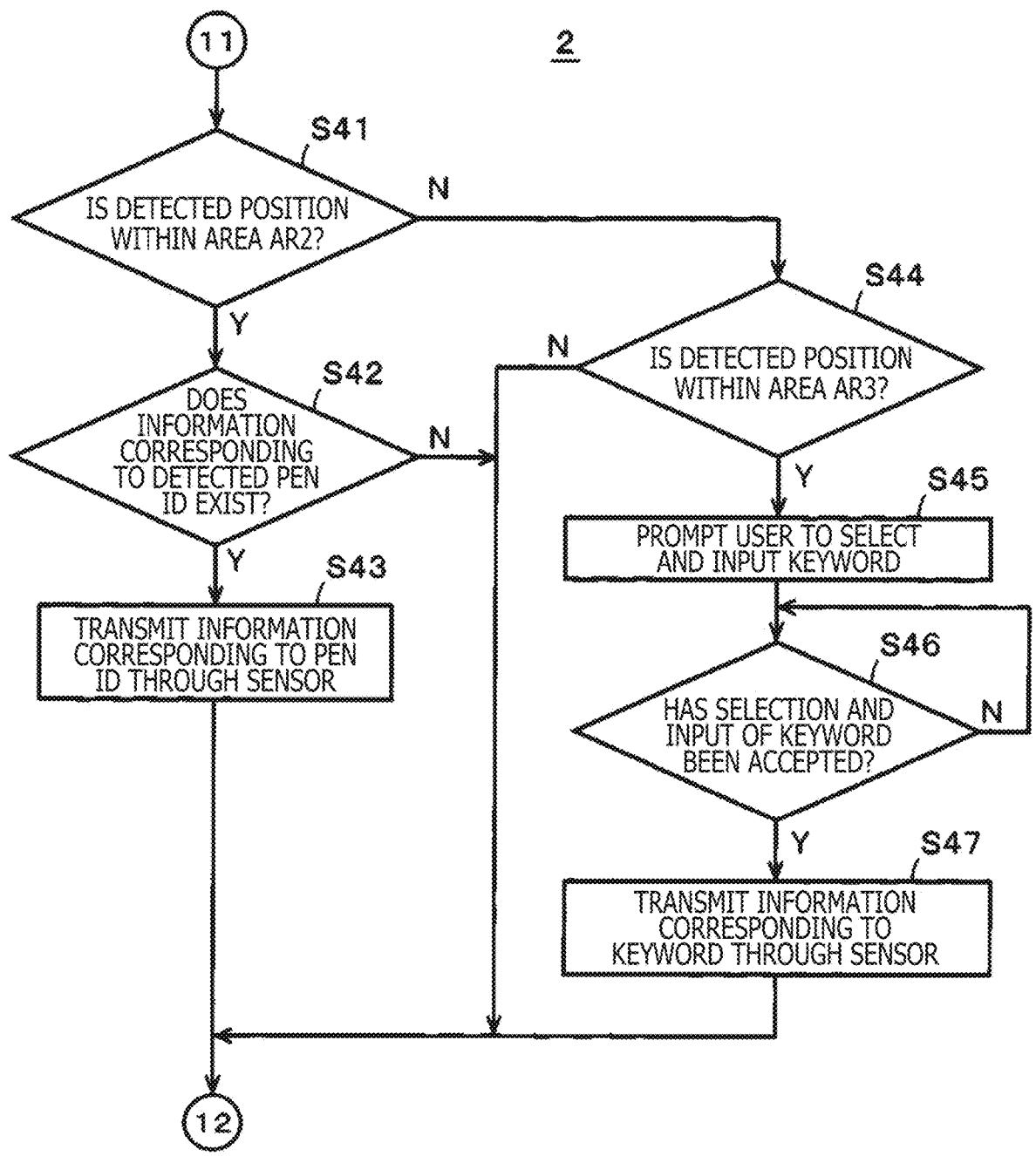
FIG. 10 is a diagram illustrating a part of the flowchart for describing the flow of the operations of the information processing device included in the information input/output system according to the first embodiment of the present disclosure.

FIGS. 9 and 10 are diagrams each illustrating a flowchart for describing an example of a processing flow for realizing operations including the above-described function processes in the processing circuit 200 of the information processing device 2. The operation at each box of this flowchart is performed by the control circuit 201 of the processing circuit 200.

The control circuit 201 transmits signals (including a timing signal and a signal indicating the specifications) for capacitive-coupling to the electronic pen 3 (S31). In response to the transmitted signals, the capacitive-coupled electronic pen 3 transmits a signal such as a position detection signal. Accordingly, the control circuit 201 determines whether or not the signal from the electronic pen 3 has been received (S32). When the control circuit 201 determines that the signal has not been received from the electronic pen 3, the control circuit 201 returns to S31 and repeats the processing from S31.

When the control circuit 201 determines at S32 that the signal has been received from the electronic pen 3, the control circuit 201 processes the received signal (S33). The processing herein includes detection of the position indicated by the electronic pen 3 on the position detection sensor 21, detection of the tilt of the electronic pen 3, and acquisition of the pen pressure information and the pen ID.

Next, the control circuit 201 determines whether or not the detected position indicated by the electronic pen 3 is within the writing input detection area AR0 (S34). When the control circuit 201 determines at S34 that the detected position indicated by the electronic pen 3 is within the writing input detection area AR0, the control circuit 201 stores the detected indicated position, the detected tilt angle of the electronic pen 3, and the acquired pen pressure information and pen ID in the storage device 207 (S35). After S35, the control circuit 201 returns to S32 and repeats the processing from S32.

When the control circuit 201 determines at S34 that the detected position indicated by the electronic pen 3 is not within the writing input detection area AR0, the control circuit 201 determines whether or not the detected position indicated by the electronic pen 3 is within the partial detection area AR1 (S36). When the control circuit 201 determines at S36 that the detected position indicated by the electronic pen 3 is within the partial detection area AR1, the control circuit 201 reads out the position indicated by the electronic pen 3 and the tilt angle, the pen pressure information, and the pen ID of the electronic pen 3 stored up to this point from the storage device 207 and transmits them from the partial detection area AR1 of the position detection sensor 21 (S37). After S37, the control circuit 201 returns to S32 and repeats the processing from S32.

When the control circuit 201 determines at S36 that the detected position indicated by the electronic pen 3 is not within the partial detection area AR1, the control circuit 201 determines whether or not the detected position indicated by the electronic pen 3 is within the partial detection area AR2 (S41 of FIG. 10). When the control circuit 201 determines at S41 that the detected position indicated by the electronic pen 3 is within the partial detection area AR2, the control circuit 201 determines whether or not information corresponding to the pen ID acquired at S33 is stored in the storage device 207 (S42).

When the control circuit 201 determines at S42 that the information corresponding to the pen ID acquired at S33 is stored in the storage device 207, the control circuit 201 reads out the information corresponding to the pen ID from the storage device 207 and transmits the information from the partial detection area AR2 of the position detection sensor 21 (S43). After S43, the control circuit 201 returns to S32 and repeats the processing from S32. When the control circuit 201 determines at S42 that the information corresponding to the pen ID acquired at S33 is not stored in the storage device 207, the control circuit 201 returns to S32 and repeats the processing from S32.

When the control circuit 201 determines at S41 that the detected position indicated by the electronic pen 3 is not within the partial detection area AR2, the control circuit 201 determines whether or not the detected position indicated by the electronic pen 3 is within the partial detection area AR3 (S44). When the control circuit 201 determines at S44 that the detected position indicated by the electronic pen 3 is within the partial detection area AR3, the control circuit 201 displays a list of selectable keywords and a message prompting the user to select and input a keyword on the display screen of the display device 22 (S45).

Next, the control circuit 201 determines whether or not the selection and input of the keyword have been accepted (S46). When the control circuit 201 determines that the selection and input of the keyword have been accepted, the control circuit 201 reads out the information stored in the storage device 207 in association with the selected keyword and transmits the information from the partial detection area AR3 of the position detection sensor 21 (S47). After S47, the control circuit 201 returns to S32 and repeats the processing from S32. When the control circuit 201 determines at S44 that the detected position indicated by the electronic pen 3 is not within the partial detection area AR3, the control circuit 201 also returns to S32 and repeats the processing from S32.

Effects of First Embodiment

In this way, in the information input/output system 1 according to the above-described first embodiment, when the electronic pen 3 indicates a position within a partial detection area set in advance within the detection region of the position detection sensor 21 of the information processing device 2, information stored in the storage device 207 in association with the partial detection area is transmitted to the electronic pen 3 and stored in the information storage device 34 of the electronic pen 3.

Further, the information stored in the information storage device 34 can be transmitted to another information processing device by pairing the short-range wireless communication device 35 of the electronic pen 3 with a short-range wireless communication device of the other information processing device. That is, in the information input/output system 1 according to the present embodiment, the information stored in the storage device 207 of the information processing device 2 can be transferred to another information processing device via the electronic pen 3. Therefore, in the information input/output system 1 according to the present embodiment, various types of useful information can be transferred.

For example, in the above-described first embodiment, writing input information is stored in the storage region associated with the partial detection area AR1. Accordingly, unfinished writing input information that has been written on the information processing device 2 can be transferred to another information processing device via the information storage device 34 of the electronic pen 3. This is very convenient since the user can continue to perform the writing input of the unfinished writing input information, which has been written on the information processing device 2, on the other information processing device.

Further, information associated with the pen ID of the electronic pen 3 is stored in the storage region associated with the partial detection area AR2. Accordingly, the information associated with the pen ID can be transferred to another information processing device via the information storage device 34 of the electronic pen 3. Therefore, the information that needs to be communicated to the user of the electronic pen 3 can be easily communicated to the user via the electronic pen 3.

Further, pieces of information associated with keywords are stored in the storage region associated with the partial detection area AR3 and the user of the electronic pen 3 can select a keyword. Accordingly, information corresponding to the keyword desired by the user can be transferred to another information processing device via the information storage device 34 of the electronic pen 3.

Modifications of First Embodiment

In the first embodiment described above, not only the writing input information but also all the information to be transmitted to the electronic pen 3 are stored and retained in advance in the storage device 207 of the information processing device 2. Alternatively, the storage device may be a storage device included in an external device connected through the communication device 209. Specifically, when a predetermined partial detection area is indicated by the electronic pen 3, the information processing device 2 may transmit a request for acquisition of information corresponding to the indicated partial detection area to another device including a storage device. After that, the information processing device 2 may acquire the information transmitted from the other device in response to the acquisition request and transmit the information to the electronic pen 3.

Further, in the first embodiment described above, pieces of information associated with keywords are also stored in the storage device 207 in advance. Alternatively, a keyword selected by the electronic pen 3 or a keyword written and input by the electronic pen 3 may be transmitted to an Internet search site through the communication device 209, and a search result transmitted from the search site may be transmitted to the electronic pen 3. That is, the information corresponding to the keyword is not stored in advance, but may be searched for and acquired in real time, and the acquired information may be transmitted to the electronic pen 3.

The information to be transferred to the electronic pen 3 is not limited to the display information as with the above-described embodiment and may be audio information or the like. Further, the information to be transferred may be a predetermined program or the like.

Second Embodiment

In the first embodiment, the sensor connected to the information processing device is the position detection sensor capable of detecting an indicated position. Alternatively, the sensor may be the one that does not have a position detection function. The sensor used in the second embodiment does not have a position detection function. However, the sensor can detect an indication operation performed by an indication operation device such as an electronic pen by detecting the reception of a signal from the indication operation device, transmit it to an information processing device, and also transmit a signal from the information processing device to the electronic pen.

Figure 11:
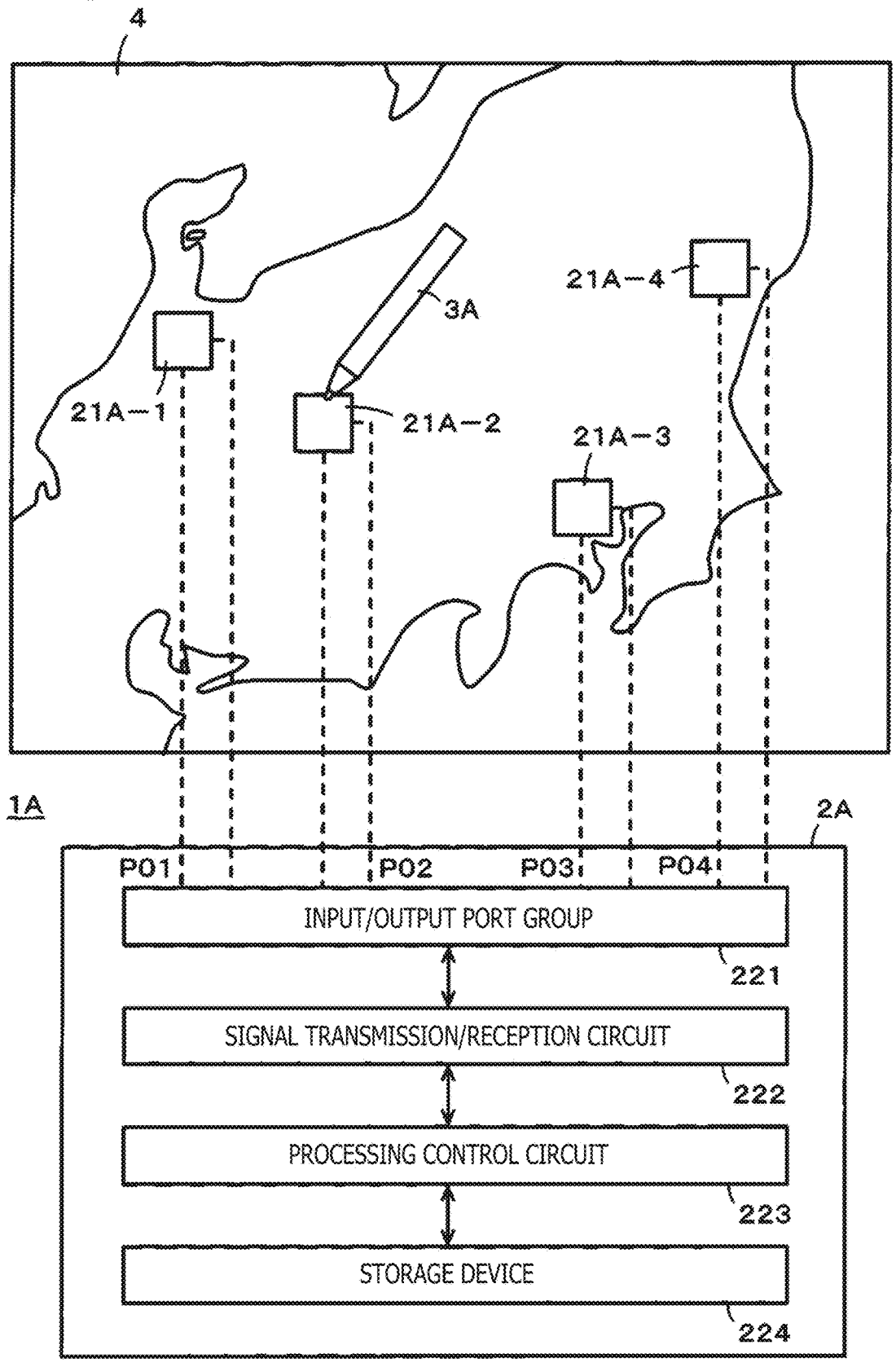
FIG. 11 is a diagram for describing an example of a configuration of an information input/output system according to a second embodiment of the present disclosure.

FIG. 11 is a diagram for describing an overview of an example of a configuration of an information input/output system 1A according to a second embodiment. The information input/output system 1A according to the second embodiment includes an information processing device 2A and an electronic pen 3A.

As illustrated in FIG. 12, the electronic pen 3A according to this example is for use in a high-performance mobile phone terminal 5 called a smartphone, for example. Since the electronic pen 3A according to this example has a similar configuration to that of the electronic pen 3 according to the first embodiment, the description of the configuration will be omitted. In the following description of the electronic pen 3A, components similar to those of the electronic pen 3 according to the first embodiment will be given the same reference signs with a suffix A added thereto.

Although not illustrated, the high-performance mobile phone terminal 5 includes a position detection sensor 5S of the capacitance type, which is superimposed on a display screen 5D, and is configured to be electric-field coupled to a core body 31A and a peripheral electrode 32A of the electronic pen 3A. Further, the high-performance mobile phone terminal 5 can detect the position indicated by the core body 31A of the electronic pen 3A and the tilt angle of the electronic pen 3A. The high-performance mobile phone terminal 5 includes a short-range wireless communication device and can wirelessly communicate with a short-range wireless communication device 35A of the electronic pen 3A. The electronic pen 3A includes an information storage device 34A and can transmit information stored in the information storage device 34A to the information processing device 2A through the short-range wireless communication device 35A.

In the information input/output system 1A according to the second embodiment, one or more sensors 21A can be connected to the information processing device 2A. In the example of FIG. 11, four sensors 21A are connected to the information processing device 2A.

FIGS. 13A and 13B illustrate an example of a configuration of the sensors 21A. Specifically, FIG. 13A is a plan view of one of the sensors 21A according to this example, while FIG. 13B is a sectional view of the sensor 21A according to this example. As illustrated in FIGS. 13A and 13B, the sensor 21A according to this example has a configuration in which a sensor main body 210A is disposed in a box-shaped case 214A, which has an opening on the upper surface side. The sensor main body 210A includes a substrate 211A, which includes an insulator, a first electrode 212A, which is formed on the front surface of the substrate 211A, and a second electrode 213A, which is formed on the back surface of the substrate 211A.

In the example of FIG. 13B, one first electrode 212A and one second electrode 213A are formed on their respective surfaces of the substrate 211A. However, a plurality of first electrodes 212A and a plurality of second electrodes 213A may be formed on their respective surfaces of the substrate 211A. Further, although the first electrode 212A and the second electrode 213A are formed in a line or band shape in the example of FIGS. 13A and 13B, the first electrode 212A and the second electrode 213A may be formed in the entire region of the front surface of the substrate 211A and the entire region of the back surface of the substrate 211A, respectively.

In the sensor 21A according to this example, as illustrated in FIGS. 13A and 13B, the sensor main body 210A is housed in the case 214A such that the first electrode 212A formed on the front surface of the substrate 211A is exposed to outside. Further, in the sensor 21A according to this example, as illustrated in FIG. 13A, a terminal 215A, which is connected to the first electrode 212A, and a terminal 216A, which is connected to the second electrode 213A, are disposed so as to be led out to the outside of the case 214A.

As illustrated in FIG. 11, the information processing device 2A includes an input/output port group 221, a signal transmission/reception circuit 222, a processing control circuit 223, and a storage device 224. The input/output port group 221 includes a plurality of input/output ports. The signal transmission/reception circuit 222 is connected to the input/output port group 221. The processing control circuit 223 is connected to the signal transmission/reception circuit 222. The storage device 224 is connected to the processing control circuit 223.

Each sensor 21A can be connected to a corresponding one of the plurality of input/output ports of the input/output port group 221. A port number is assigned to each of the plurality of input/output ports of the input/output port group 221. In this example, the four sensors 21A are connected to the respective input/output ports with the port numbers PO1, PO2, PO3, and PO4. In this case, in the example of FIG. 11, the terminals 215A and 216A of each sensor 21A are connected to the corresponding one of the input/output ports with the port numbers PO1, PO2, PO3, and PO4 by connection lines denoted by the dotted lines.

Alternatively, the sensors 21A and the information processing device 2A may be wirelessly connected to each other. In this case, identification information (ID) that identifies each sensor 21A is added to information to be transmitted from each sensor 21A to the information processing device 2A. Further, information transmitted from the information processing device 2A to the destination sensor 21A that receives the information includes the ID of the destination sensor 21A. Accordingly, based on the ID included in the information, the sensor 21A can determine whether or not the received information is the information addressed to itself.

In the following description, when the sensors 21A connected to the respective input/output ports with the port numbers PO1, PO2, PO3, and PO4 need to be distinguished from each other, the individual sensors 21A will be referred to as a sensor 21A-1, a sensor 21A-2, a sensor 21A-3, and a sensor 21A-4 as illustrated in FIG. 11.

As illustrated in FIG. 14, pieces of provision information INFO1, INFO2, INFO3, and INFO4 respectively associated with the port numbers PO1, PO2, PO3, and PO4 are stored in advance in the storage device 224 of the information processing device 2A.

In the example of FIG. 11, the sensor 21A-1, the sensor 21A-2, the sensor 21A-3, and the sensor 21A-4 are disposed on a board 4 on which a Japanese map is displayed. Topic information, tourist information, and other information related to each of the locations on the Japanese map where the sensor 21A-1, the sensor 21A-2, the sensor 21A-3, and the sensor 21A-4 are disposed are stored in advance in the storage device 224 as the pieces of provision information INFO1, INFO2, INFO3, and INFO4.

Specifically, in the example of FIG. 11, for example, the sensor 21A-1, the sensor 21A-2, the sensor 21A-3, and the sensor 21A-4 are disposed on the locations that correspond to "Ishikawa prefecture," "Gifu prefecture," "Kanagawa prefecture," and "Fukushima prefecture" on the Japanese map, respectively. Further, pieces of information related to the locations "Ishikawa prefecture," "Gifu prefecture,"

"Kanagawa prefecture," and "Fukushima prefecture" are respectively stored in advance in the storage device 224 as the pieces of provision information INFO1, INFO2, INFO3, and INFO4.

The Japanese map used herein may be a map printed on paper and attached to the plate-like board 4. In this case, the sensor 21A-1, the sensor 21A-2, the sensor 21A-3, and the sensor 21A-4 may be attached to this paper map by double-sided tape or the like. Alternatively, the board 4 may be configured as a display device. In this case, the sensor 21A-1, the sensor 21A-2, the sensor 21A-3, and the sensor 21A-4 may be attached to a display screen of the display device on which the Japanese map is displayed by double-sided tape or the like.

In addition, signs indicating identifiers such as numbers that identify the respective locations whose pieces of provision information INFO1, INFO2, INFO3, and INFO4 are stored in the storage device 224 may be added to or displayed on the map. Further, each of the sensor 21A-1, the sensor 21A-2, the sensor 21A-3, and the sensor 21A-4 may be assigned a corresponding identifiable number and disposed separately from the map.

As illustrated in FIG. 13B, when the pen tip of the electronic pen 3A is brought into contact with or close to any of the four sensors 21A (the hovering state), a signal (a position detection signal or a tilt detection signal) from the electronic pen 3A is transmitted to the sensor 21A through the core body 31A or the peripheral electrode 32A. The sensor 21A receives the signal from the electronic pen 3A through the terminal 215A, which is connected to the first electrode 212A, and the terminal 216A, which is connected to the second electrode 213A, and transmits the signal to the information processing device 2A.

In the information processing device 2A, the signal from the sensor 21A is received through the input/output port of the input/output port group 221 to which this sensor 21A is connected, and then supplied to the signal transmission/reception circuit 222.

When the signal transmission/reception circuit 222 receives the signal from the input/output port group 221, the signal transmission/reception circuit 222 determines which port number PO1, PO2, PO3, or PO4 has received the received signal and then supplies information regarding the port number to the processing control circuit 223 as the result of the determination.

When the processing control circuit 223 receives the information regarding the port number that has received the received signal from the signal transmission/reception circuit 222, the processing control circuit 223 reads out and acquires information stored in association with the port number that has received the received signal from the storage device 224 and supplies the acquired information to the signal transmission/reception circuit 222.

Through the input/output port of the input/output port group 221 with the port number that has received the received signal, the signal transmission/reception circuit 222 transmits the information received from the processing control circuit 223 to the sensor 21A to which this input/output port is connected.

The sensor 21A receives the information from the information processing device 2A through the terminals 215A and 216A and transmits the information from the first electrode 212A and the second electrode 213A to the electronic pen 3A through electric-field coupling.

In the electronic pen 3A, as described above, the peripheral electrode 32A receives the information from the sensor 21A and stores the information in the information storage device 34A during the signal reception mode. Then, the electronic pen 3A transmits the information stored in the information storage device 34A to the high-performance mobile phone terminal 5 using the short-range wireless communication device 35A as indicated by an arrow in FIG. 12, causing the high-performance mobile phone terminal 5 to display the information on the display screen 5D.

Therefore, in the information input/output system 1A according to the second embodiment, when the user of the high-performance mobile phone terminal 5 brings the pen tip of the electronic pen 3A into contact with or close to the sensor 21A disposed at a location regarding which the user wants to see the information, the information processing device 2A can cause the information related to the location to be stored in the information storage device 34A of the electronic pen 3A. Then, the user brings the electronic pen 3A and the high-performance mobile phone terminal 5 into a state in which they can be wirelessly communicated with each other by using the short-range wireless communication device 35A of the electronic pen 3A. Accordingly, the information stored in the information storage device 34A of the electronic pen 3A can be displayed and viewed on the display screen 5D of the high-performance mobile phone terminal 5.

In the case of the second embodiment as well, as denoted by the dotted line in FIG. 12, the electronic pen 3A may transmit the information stored in the information storage device 34 to the high-performance mobile phone terminal 5 not from the short-range wireless communication device 35 but from the core body 31A or the peripheral electrode 32A through the position detection sensor of the high-performance mobile phone terminal 5.

Modifications of Sensors According to Second Embodiment

Figure 15A:
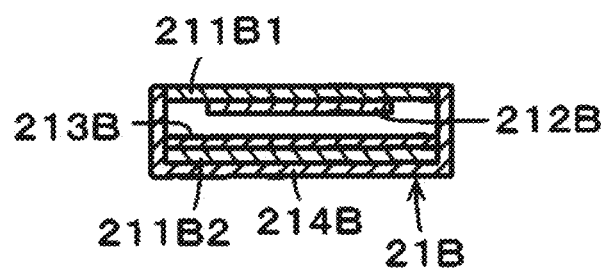
FIGS. 15A and 15B are views for describing another example of the configuration of the sensor of the information processing device included in the information input/output system according to the second embodiment of the present disclosure.
Figure 15B:
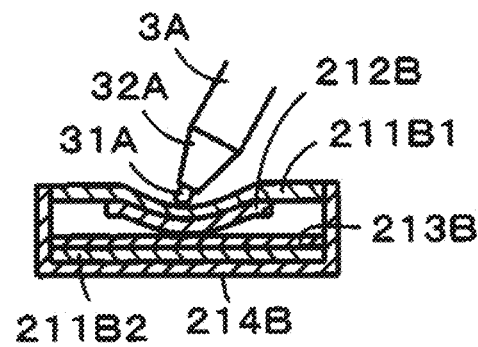

FIGS. 15A and 15B illustrate another example of the configuration of the sensors connected to the information processing device 2A in the information input/output system 1A according to the second embodiment.

Specifically, FIGS. 15A and 15B illustrate an example of a configuration of a sensor 21B according to this example. FIG. 15A is a sectional view of the sensor 21B according to this example. A plan view of the sensor 21B according to this example is similar to the plan view of the sensor 21A described above. FIG. 15B is a view illustrating the state in which the electronic pen 3A is performing an indication operation on the sensor 21B.

As illustrated in FIGS. 15A and 15B, the sensor 21B according to this example has a configuration in which two substrates 211B1 and 211B2 are disposed in a box-shaped case 214B, which has an opening on the upper surface side. The two substrates 211B1 and 211B2 are disposed in parallel so as to face each other with an air layer, which is an insulator, interposed therebetween. In this example, at least the substrate 211B1 is made of a flexible member.

A first electrode 212B and a second electrode 213B are respectively formed on the surface of the substrate 211B1 and the surface of the substrate 211B2, which face each other via the air layer. In the example of FIGS. 15A and 15B, one first electrode 212B and one second electrode 213B are formed on their respective surfaces. However, a plurality of first electrodes 212B and a plurality of second electrodes 213B may be formed on their respective surfaces. Further, although the first and second electrodes 212B and 213B are formed in a line or band shape in the example of FIGS. 15A and 15B, the first and second electrodes 212B and 213B may be formed in the entire regions of the surfaces of their respective substrates 211B1 and 211B2, which face each other.

As illustrated in FIGS. 15A and 15B, in this example, the sensor 21B is housed in the case 214B such that the surface of the substrate 211B1 opposite to the surface on which the first electrode 212B is formed is exposed to outside. Although not illustrated, in the sensor 21B, a terminal connected to the second electrode 213B is disposed so as to be led out to the outside of the case 214B. The terminal connected to the second electrode 213B of the sensor 21B is connected to an input/output port of the information processing device 2A.

In the sensor 21B according to this example, as illustrated in FIG. 15B, when the user performs an indication operation using the pen tip of the electronic pen 3A, the flexible substrate 211B1 bends, making the first electrode 212B and the second electrode 213B in contact with each other. Therefore, a signal transmitted from the core body 31A or the peripheral electrode 32A of the electronic pen 3A is transmitted to the information processing device 2A through the point of contact between the first electrode 212B and the second electrode 213B as well as the terminal of the sensor 21B. Further, information from the information processing device 2A is transmitted to the peripheral electrode 32A of the electronic pen 3A through the point of contact between the first electrode 212B and the second electrode 213B of the sensor 21B. The other configurations and operations of the sensor 21B are similar to those of the sensor 21A according to the second embodiment described above.

Other Examples of Indication Operation Device

In the above-described embodiments, the indication operation device uses a pen-type electronic pen. In the present disclosure, however, the indication operation device is not limited to the pen type.

Figure 16A:
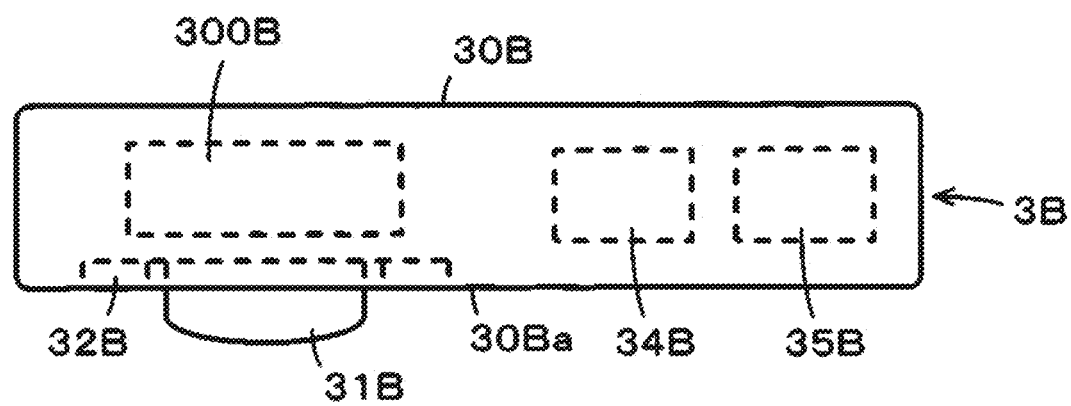
FIGS. 16A and 16B are views for describing another example of the configuration of the indication operation device included in the information input/output system according to an embodiment of the present disclosure.
Figure 16B:
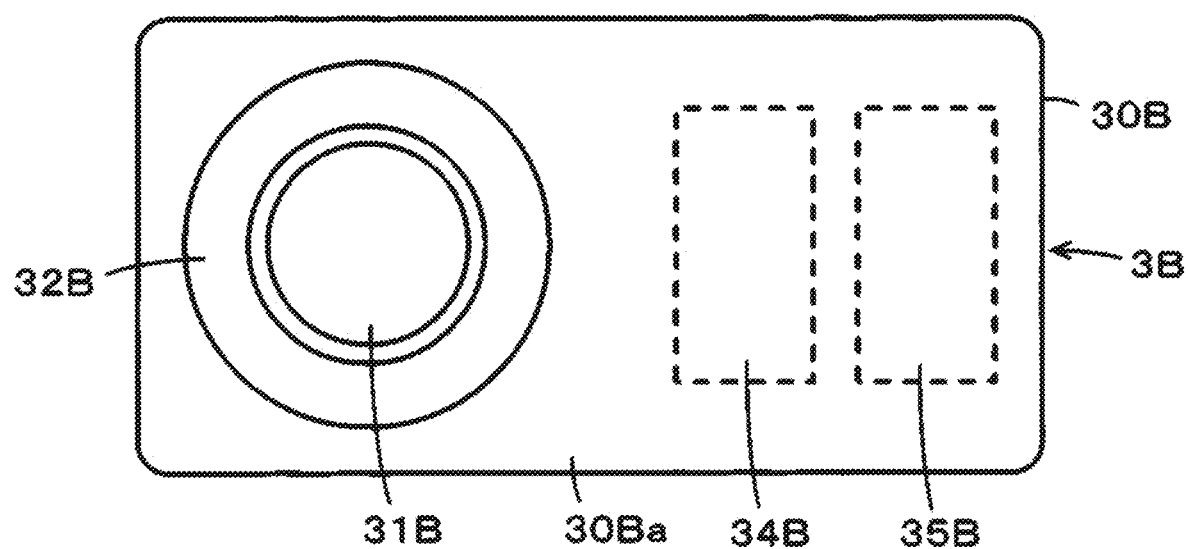

FIGS. 16A and 16B illustrate an example of a configuration of another example of the indication operation device. The indication operation device according to the example of FIGS. 16A and 16B is not the pen type, but, in this example, has a rectangular parallelepiped pack type configuration. FIG. 16A is a side view of an indication operation device 3B according to this example. FIG. 16B is a bottom view of the indication operation device 3B according to this example.

In order to facilitate understanding of the configuration of the indication operation device 3B according to this example, functional portions of the indication operation device 3B similar to the constituent components of the electronic pen 3 according to the first embodiment described above are given the same reference signs with a suffix B added thereto.

As illustrated in FIGS. 16A and 16B, the indication operation device 3B according to this example includes an electronic circuit 300B, an information storage device 34B, and a short-range wireless communication device 35B inside a rectangular casing 30B. Further, the indication operation device 3B includes a first electrode 31B and a second electrode 32B. The first electrode 31B projects from a bottom surface 30Ba of the rectangular casing 30B in the direction perpendicular to the bottom surface 30Ba. Further, the first electrode 31B, which has a disk shape, has an externally-protruding end surface that bulges in a dome shape. The second electrode 32B, which has a ring shape, surrounds the first electrode 31B and is exposed from the bottom surface 30Ba of the rectangular casing 30B.

The electronic circuit 300B of the indication operation device 3B according to this example includes a signal generation circuit that generates a signal to be transmitted from the first electrode 31B or the second electrode 32B and a processing function that stores information received by the first electrode 31B or the second electrode 32B in the information storage device 34B. As with the above-described embodiments, the electronic circuit 300B controls the transmission of a signal from the signal generation circuit and the reception of information from an information processing device in a time-division manner.

When the indication operation device 3B according to this example is used in place of the electronic pen 3 in the information input/output system 1 according to the first embodiment, a signal from the signal generation circuit is transmitted from either or both of the first electrode 31B and the second electrode 32B, while when a signal is received from the information processing device through the sensor, the signal is received through the second electrode 32B.

When the indication operation device 3B according to this example is used in the information input/output system 1A according to the second embodiment and the indication operation device 3B is not used for the application of the position indication in the position detection sensor, a signal from the signal generation circuit may be transmitted from either or both of the first electrode 31B and the second electrode 32B. Further, when a signal is received from the information processing device through a sensor, the signal may be received by either or both of the first electrode 31B and the second electrode 32B.

Needless to say, the indication operation device 3B according to this example may also include a pressure detector and an ID storage device. The pressure detector detects the pressure applied to the first electrode 31B. The ID storage device stores device identification information corresponding to the pen ID. In this case, a transmission signal from the indication operation device 3B may include the pressure and the device identification information.

Other Embodiments or Modifications

Although the short-range wireless communication device is used as the transmitter of the indication operation device in the above-described embodiments, another wireless communication unit can also be used. Further, the transmitter of the indication operation device is not limited to the wireless communication unit. For example, the electronic pen 3 or 3A or the indication operation device 3B may include an output terminal such as a universal serial bus (USB) terminal for outputting information stored in the information storage device to an external device.

It is to be noted that the embodiments of the present disclosure are not limited to the foregoing embodiments, and that various changes can be made without departing from the spirit of the present disclosure.

Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An information input/output system comprising:
an indication operation device; and
an information processing device including a sensor, wherein the indication operation device includes:
  a core body,
  a pressure detector that, in operation, detects a pressure applied to a tip of the core body,
  a first electrode,
  a second electrode,
  a signal generation circuit which, in operation, generates a signal to be transmitted to the information processing device,
  a first transmission circuit which, in operation, transmits the signal from the signal generation circuit to the sensor of the information processing device through the first electrode or the second electrode,
  a reception circuit which, in operation, receives information from the information processing device through the first electrode or the second electrode,
  an information storage device which, in operation, stores the information received by the reception circuit, and
  a transmitter that is different from the first electrode and the second electrode, wherein the transmitter, in operation, transmits pressure information corresponding to the pressure detected by the pressure detector and the information stored in the information storage device to an outside of the indication operation device, and
the information processing device includes:
  a processor which, in operation, processes the signal received from the indication operation device through the sensor,
  an acquisition circuit which, in operation, acquires information corresponding to a result of processing performed by the processor, and
  a second transmission circuit which, in operation, transmits the information acquired by the acquisition circuit to the indication operation device through the sensor.

2. The information input/output system according to claim 1, wherein the first electrode and the second electrode of the indication operation device are configured so as to be electric-field coupled to the sensor of the information processing device.

3. The information input/output system according to claim 1, wherein the sensor of the information processing device includes at least a set of at least two types of electrodes facing each other via an insulating layer.

4. The information input/output system according to claim 1, wherein:
  the sensor of the information processing device includes two types of conductor groups facing each other via an insulating layer,
  one of the conductor groups includes a plurality of electrodes arranged on a first plane so as to be parallel to each other in a first direction,
  another one of the conductor groups includes a plurality of electrodes arranged on a second plane so as to be parallel to each other in a direction intersecting the first direction, and
  the processor of the information processing device includes a position detection circuit which, in operation, detects a position on a plane parallel to the first plane and the second plane of the sensor which, in operation, receives the signal from the indication operation device.

5. The information input/output system according to claim 4, wherein the processor of the information processing device, in operation, performs processing corresponding to the position detected by the position detection circuit.

6. The information input/output system according to claim 5, wherein:
  the information processing device includes a display device including a display screen,
  the sensor is superimposed on the display screen, and
  the processor of the information processing device, in operation, reflects a result of position detection performed by the position detection circuit in a display image on the display screen that corresponds to the position detected by the position detection circuit.

7. The information input/output system according to claim 4, wherein the acquisition circuit of the information processing device, in operation, acquires information corresponding to the position detected by the position detection circuit.

8. The information input/output system according to claim 4, wherein the acquisition circuit of the information processing device, in operation, acquires information corresponding to the position detected by the position detection circuit and the signal received from the indication operation device through the sensor.

9. The information input/output system according to claim 8, wherein the signal received from the indication operation device through the sensor includes identification information of the indication operation device or identification information of a user of the indication operation device.

10. The information input/output system according to claim 8, wherein the signal received from the indication operation device through the sensor includes a predetermined keyword.

11. The information input/output system according to claim 4, wherein:
  the acquisition circuit of the information processing device, in operation, acquires information regarding the position detected by the position detection circuit, and
  the second transmission circuit, in operation, transmits the information regarding the position detected by the position detection circuit, which has been acquired by the acquisition circuit, to the indication operation device through the sensor.

12. The information input/output system according to claim 1, wherein the transmitter of the indication operation device is a wireless communication device.

13. The information input/output system according to claim 1, wherein the transmitter is a short-range wireless communication device.

14. The information input/output system according to claim 1, wherein:
  the information processing device includes a storage device which, in operation, stores the information corresponding to the result of the processing performed by the processor, and
  the acquisition circuit, in operation, reads out and acquires, from the storage device, the information to be transmitted to the indication operation device through the sensor.

15. The information input/output system according to claim 1, wherein:
  the information processing device includes a communication device which, in operation, connects to a communication network, and
  the acquisition circuit, in operation, acquires, by using the communication device, the information corresponding to the result of the processing performed by the processor through the communication network.

16. The information input/output system according to claim 1, wherein the indication operation device is a pen-type device.

17. The information input/output system according to claim 1, wherein the indication operation device is a pack-type device.

* * * * *